US008117280B2

(12) United States Patent　　(10) Patent No.: US 8,117,280 B2
Masuouka et al.　　(45) Date of Patent: Feb. 14, 2012

(54) TASK COMPUTING

(75) Inventors: Ryusuke Masuouka, Potomac, MD (US); Yannis Labrou, Baltimore, MD (US); Zhexuan Song, Silver Spring, MD (US); Sung Youn Lee, Great Falls, VA (US)

(73) Assignee: Fujitsu Limited, Kawasaki (JP)

( * ) Notice: Subject to any disclaimer, the term of this patent is extended or adjusted under 35 U.S.C. 154(b) by 978 days.

(21) Appl. No.: 11/512,405

(22) Filed: Aug. 30, 2006

(65) Prior Publication Data

US 2007/0033590 A1　　Feb. 8, 2007

Related U.S. Application Data

(63) Continuation-in-part of application No. 11/115,403, filed on Apr. 27, 2005, now Pat. No. 7,761,885, and a continuation-in-part of application No. 10/733,328, filed on Dec. 12, 2003.

(60) Provisional application No. 60/714,952, filed on Sep. 8, 2005.

(51) Int. Cl.
*H24L 29/06* (2006.01)
*H24L 29/08* (2006.01)

(52) U.S. Cl. ................... 709/218; 370/230; 370/401

(58) Field of Classification Search .............. 709/218, 709/219
See application file for complete search history.

(56) References Cited

U.S. PATENT DOCUMENTS

| | | | | |
|---|---|---|---|---|
| 5,224,205 A * | 6/1993 | Dinkin et al. | ................. | 709/226 |
| 5,530,861 A | 6/1996 | Diamant et al. | | |
| 5,815,811 A * | 9/1998 | Pinard et al. | ................. | 455/434 |
| 5,968,116 A * | 10/1999 | Day et al. | ................. | 709/202 |
| 5,979,757 A * | 11/1999 | Tracy et al. | ................. | 235/383 |
| 6,002,918 A * | 12/1999 | Heiman et al. | ................. | 340/7.38 |
| 6,067,297 A * | 5/2000 | Beach | ................. | 370/389 |
| 6,084,528 A * | 7/2000 | Beach et al. | ................. | 340/5.9 |
| 6,101,528 A * | 8/2000 | Butt | ................. | 709/203 |
| 6,173,316 B1 * | 1/2001 | De Boor et al. | ................. | 709/218 |
| 6,178,426 B1 * | 1/2001 | Klein et al. | ................. | 1/1 |

(Continued)

FOREIGN PATENT DOCUMENTS

JP　　2004-318809　　11/2004

OTHER PUBLICATIONS

U.S. Office Action mailed May 24, 2010 in related co-pending U.S. Appl. No. 11/014,904.

(Continued)

*Primary Examiner* — Evens J Augustin
(74) *Attorney, Agent, or Firm* — Staas & Halsey LLP

(57) ABSTRACT

An apparatus provides computing sources of functionality, each computing source of functionality presents a service and exists in any computing environment of the apparatus. The apparatus associates a semantic service description (SSD) with the service. The SSD has a semantic description of the service, including a semantic description of a parameter of the service, according to a computer interpretable language, and, as a service grounding, a mapping between the computer interpretable language expressing the SSD and an interface, including an interface parameter, of the service. The apparatus dynamically discovers SSDs as available services through discovery mechanisms, filters the services based upon the semantic description in each SSD associated with each service, generates a user interface to dynamically compose a task based upon selecting the services and the filtering the services to continuously present possible tasks, and generates an executable semantic service workflow description of the composed task.

18 Claims, 18 Drawing Sheets

U.S. PATENT DOCUMENTS

| | | | | |
|---|---|---|---|---|
| 6,188,681 | B1 * | 2/2001 | Vesuna | 370/338 |
| 6,199,753 | B1 * | 3/2001 | Tracy et al. | 235/375 |
| 6,216,158 | B1 * | 4/2001 | Luo et al. | 709/217 |
| 6,286,047 | B1 * | 9/2001 | Ramanathan et al. | 709/224 |
| 6,324,567 | B2 | 11/2001 | Chidambaran et al. | |
| 6,430,395 | B2 * | 8/2002 | Arazi et al. | 455/41.2 |
| 6,446,096 | B1 * | 9/2002 | Holland et al. | 715/234 |
| 6,456,892 | B1 * | 9/2002 | Dara-Abrams et al. | 700/83 |
| 6,466,971 | B1 * | 10/2002 | Humpleman et al. | 709/220 |
| 6,502,000 | B1 * | 12/2002 | Arnold et al. | 700/83 |
| 6,509,913 | B2 * | 1/2003 | Martin et al. | 715/762 |
| 6,556,875 | B1 * | 4/2003 | Nagasaka et al. | 700/19 |
| 6,560,640 | B2 * | 5/2003 | Smethers | 709/219 |
| 6,757,902 | B2 | 6/2004 | Katz et al. | |
| 6,792,605 | B1 * | 9/2004 | Roberts et al. | 719/313 |
| 6,859,803 | B2 | 2/2005 | Dagtas et al. | |
| 6,901,596 | B1 | 5/2005 | Galloway | |
| 6,910,037 | B2 | 6/2005 | Gutta et al. | |
| 6,947,404 | B1 * | 9/2005 | Zalka | 370/338 |
| 6,956,833 | B1 * | 10/2005 | Yukie et al. | 370/328 |
| 6,983,227 | B1 | 1/2006 | Thalhammer-Reyero | |
| 7,065,058 | B1 * | 6/2006 | Korus | 370/312 |
| 7,079,518 | B2 * | 7/2006 | Park et al. | 370/338 |
| 7,170,857 | B2 * | 1/2007 | Stephens et al. | 370/230 |
| 7,376,571 | B1 | 5/2008 | Racine et al. | |
| 7,406,660 | B1 | 7/2008 | Sikchi et al. | |
| 7,424,701 | B2 | 9/2008 | Kendall et al. | |
| 7,548,847 | B2 | 6/2009 | Acero et al. | |
| 7,577,910 | B1 * | 8/2009 | Husemann et al. | 715/744 |
| 7,596,754 | B2 | 9/2009 | Wessling et al. | |
| 7,610,045 | B2 * | 10/2009 | Little et al. | 455/418 |
| 2002/0078255 | A1 | 6/2002 | Narayan | |
| 2002/0107939 | A1 * | 8/2002 | Ford et al. | 709/218 |
| 2002/0116225 | A1 | 8/2002 | Morse et al. | |
| 2003/0036917 | A1 | 2/2003 | Hite et al. | |
| 2003/0204645 | A1 | 10/2003 | Sharma et al. | |
| 2004/0054690 | A1 * | 3/2004 | Hillerbrand et al. | 707/104.1 |
| 2004/0083205 | A1 | 4/2004 | Yeager | |
| 2004/0204063 | A1 | 10/2004 | Van Erlach | |
| 2004/0207659 | A1 | 10/2004 | Goodman et al. | |
| 2004/0230636 | A1 | 11/2004 | Masuoka et al. | |
| 2005/0021560 | A1 | 1/2005 | Yoon et al. | |
| 2005/0060372 | A1 * | 3/2005 | DeBettencourt et al. | 709/206 |
| 2005/0080768 | A1 * | 4/2005 | Zhang et al. | 707/3 |
| 2005/0160362 | A1 | 7/2005 | Obradovic et al. | |
| 2006/0195411 | A1 | 8/2006 | Knight et al. | |
| 2007/0157096 | A1 | 7/2007 | Keren et al. | |

OTHER PUBLICATIONS

U.S. Notice of Allowance mailed Feb. 16, 2011 in co-pending U.S. Appl. No. 11/014,904.

Ankolekar, Anupriya, et al., "DAML-S: Web Service Description for the Semantic Web", The Semantic Web—ISWC 2002. First International Web Conference Proceedings (Lecture Notes in Computer Science vol. 2342), The Semantic Web—ISWC 2002; XP-002276131; Sardinia, Italy; Jun. 2002; (pp. 348-363).

Bader, Gary D., et al., BioPAX—Biological Pathways Exchange Language, Level 1, Version 1.0 Documentation; © 2004 BioPAX Workgroup, BioPAX Recommendation [online] Jul. 7, 2004; Retrieved from the Internet: <URL: http://www.biopax.org/release/biopax-level1.owl>.

De Roure, David, et al., "E-Science", Guest Editors' Introduction, IEEE Intelligent Systems; Published by the IEEE Computer Society, © Jan./Feb. 2004 IEEE, pp. 24-63.

"Gene Ontology Consortium" OBO—Open Biological Ontologies; [online] [Retrieved on Oct. 22, 2004] Retrieved from the Internet <URL: http://www.geneontology.org/> (6 pages).

Handschuh S., et al. "Annotation for the deep web", IEEE Intelligent Systems, IEEE Service Center, New York, NY, US, vol. 18, No. 5, Sep. 1, 2003; pp. 42-48; XP011101996 ISSN: 1094-7167—Abstract (1 page).

Zhexuan Song, et al. "Dynamic Service Discovery and Management in Task Computing, "pp. 310-318, MobiQuitous 2003, Aug. 22-26, 2004, Boston, pp. 1-9.

MaizeGDB, "Welcome to MaizeGDB!", Maize Genetics and Genomics Database; [online] [Retrieved on Oct. 22, 2004] Retrieved from the Internet <http://www.maizegdb.org/>.

Marenco et al., "QIS: A framework for biomedical database federation" Journal of the American Medical Informatics Association, Hanley and Belfus, Philadelphia, PA, US, vol. 11, No. 6, Nov. 1, 2004; pp. 523-534, XP005638526; ISSN: 1067-5027.

Ramey, Chet; "Bash Reference Manual", Version 2.02, Apr. 1, 1998; XP-002276132; pp. i-iv; p. 1; and pp. 79-96.

Trellis, "Capturing and Exploiting Semantic Relationships for Information and Knowledge Management", The Trellis Project at Information Sciences Institute (ISI), [online] [Retrieved on Oct. 22, 2004] Retrieved from the Internet <URL: http://www.isi.edu/ikcap/trellis/> 2 pages.

Information Sciences Institute; USC Viterbi School of Engineering; [online] [Retrieved on Oct. 22, 2004] Retrieved from the Internet <URL: http://www.isi.edu> 2 pages.

Mindswap—Maryland Information and Network Dynamics Lab Semantic Web Agents Project; SWOOP—Hypermedia-based OWL Ontology Browser and Editor; [online] [Retrieved on Oct. 22, 2004] Retrieved from the Internet <URL: http://www.mindswap.org/2004/SWOOP> (3 pages).

Mindswap—Maryland Information and Network Dynamics Lab Semantic Web Agents Project; OntoLink; Semantic Web Research Group; [online] [Retrieved on Oct. 22, 2004] Retrieved from the Internet <URL: http://www.mindswap.org/2004/OntoLink> (2 pages).

Mindswap—Maryland Information and Network Dynamics Lab Semantic Web Agents Project; Pellet OWL Reasoner; [online] [Retrieved on Oct. 22, 2004] Retrieved from the Internet <URL: http://www.mindswap.org/2003/pellet/index.shtml> (3 pages).

Haarslev, Volker, "Racer", RACER System Description; News: New Racer Query Language Available; [online] [Retrieved on Oct. 22, 2004] Retrieved from the Internet <URL: http://www.cs.concordia.ca/~haarslev/racer> (10 pages).

Jambalaya, the CHISEL group; CH/SEL—Computer Human Interaction & Software Engineering Lab, Home; [online] [Retrieved on Oct. 22, 2004] Retrieved from the Internet <URL: http://www.thechiselgroup.org/jambalaya> (1 page).

Malik, Ayesha, "XML, Ontologies, and the Semantic Web", XML Journal, Openlink Virtuoso; [online] [Retrieved on Oct. 22, 2004] Retrieved from the Internet <URL: http:///www.sys-con.com/xml1/article.cfm?id=577> (7 pages).

Altschul, SF, et al., "Basic local alignment search tool", National Center for Biotechnology information, National Library of Medicine, National Institutes of Health, Bethesda, Maryland 20894; [online] [Retrieved on Oct. 22, 2004] Retrieved from the Internet <URL: http://www.ncbi.nlm.nih.gov/entrez/query.fcgi?cmd=Retrieve&db=> (3 pages).

NCBI BLAST *Information*; [online] [Retrieved on Oct. 22, 2004] Retrieved from the Internet <URL: http://www.ncbi.nih.gov/Education/BLASTinfo/information3.html> (1 page).

Example of Terrorism Ontology; [online] [Retrieved on Dec. 16, 2004] Retrieved from the Internet <URL http://www.mindswap.org/2003/owl/swint/terrorism> (7 pages).

Guttman, E., et al., "Service Location Protocol, Version 2", Network Working Group; @ Home Network; Vinca Corporation; Jun. 1999 (pp. 1-55).

Masuoka, Ryusuke, et al., "Task Computing—The Semantic Web meets Pervasive Computing—" Fujitsu Laboratories of America, Inc., [online] vol. 2870, 2003, pp. 866-881, <URL: http://www.mindswap.org> XP-002486064.

Rysuke Masuoka, et al. "Semantic Web and Ubiquitous Computing-Task Computing as an Example-" *AIS SIGSEMIS* Bullentin, vol. 1 No. 3, Oct. 2004, pp. 21-24.

Rysuke Masuoka, et al. "Ontology-Enabled Pervasive Computing Applications,"*IEEE Intelligent Systems*, vol. 18, No. 5, Sep./Oct. 2003 (Sep. 1, 2003), pp. 68-72.

Rysuke Masuoka, et al. Task Computing—Semantic-web enabled, user driven, interactive environments, WWW Based Communities for Knowledge Presentation, Sharing, Mining and Protection (The PSMP workshop) within CIC 2003, Jun. 23-26, 2003, pp. 1.

Rysuke Masuoka, et al. "Task Computing—Filling the Gap Between Tasks and Services, " Fujitsu, vol. 55;No. 4; pp. 376-383 (2004) (In Japanese) (English Abstract) (1 page).

Masuoka Ryusuke, DAML Program and the Semantic Web : Toward a More Ontological World, Journal of Japanese Society for Artificial Intelligence, Japan 2002.7 17(4) pp. 392-399 (pp. 397-398 "6. The future of DAML").

Goble, C., et al., Semantic Web and Grid Computing, [online], Sep. 5, 2002., pp. 1-23, [H20.8.27. search], Internet<URL: http://www.semanticgrid.org/documents/swgc/swgc-final.pdf (pp. 16-17 "8.1 MyGrid (www.mygrid.org.uk)" and Figure 5).

Preece, A., et al., Intelligent Web Services, Intelligent Systems, IEEE, Jan. 2002., vol. 17, Issue 1, pp. 15-17 (p16, Column right and p. 17, Column left).

1. The Semantic Grid, [online], Oct. 2002., [H21.1.5. search], Internet<URL: http://web.archive.org/web/20021011030835/http://www.semanticgrid.org/documents/>.

The Semantic Web—ISWC 2002, First International Semantic Web Conference, Sardinia, Italy, Jun. 9-12, 2002, Proceedings, Springer, 2002.6.9., [H21.1.6. search], Internet<URL: http://www.springer.com/computer/database+management+%26+information+retrieval/book/978-3-540-43760-4?detailsPage=toc>.

European Search Report Communication issued May 7, 2004 in related Europeans Application No. 03257974.0-1243 (4 pages).

European Patent Office Communication issued Sep. 5, 2005 in related European Application No. 03257974.0-1243 (12 pages).

European Patent Office Communication issued Jan. 22, 2007 in related European Application No. 03257974.0-1243.

First Notification of Office Action issued by the State Intellectual Property Office of China on Jul. 27, 2007 in related China Application No. 200310123963.2, including the Text of the First Office Action (28 pages).

First Notification of Office Action (PCT Application Entry Into the National Phase) issued by the State Intellectual Property Office of China on Dec. 7, 2007, in the related Chinese Patent Application No. 200580013453.7 (22 pages).

Second Notification of Office Action issued by the State Intellectual Property Office of China on Jan. 4, 2008, in related Chinese Patent Application No. 200310123963.2 (2 pages).

First Notification of Office Action issued by the State Intellectual Property Office of China on Mar. 14, 2008 in corresponding Chinese Patent Application No. 200510132687.5 (9 pages).

Second Notification of Office Action issued by the State Intellectual Property Office of China on Sep. 5, 2008 in corresponding Chinese Patent Application No. 200510132687.5, including the Text of the Second Office Action (8 pages).

Third Notification of Office Action issued by the State Intellectual Property Office of China on May 9, 2008 in related China Application No. 200310123963.2, including the Text of the Third Office Action (8 pages).

Rejection Decision issued by the State Intellectual Property Office of China on Sep. 5, 2008 in related China Application No. 200310123963.2, including the Text of the Decision for Rejection (8 pages).

Extended European Search Report Communication issued Aug. 11, 2008 in corresponding European Application No. 05027181.6-1527/1672537.

Notice of Completion of Formalities for Patent Registration with the Notice of Decision of Granting Patent Right for Invention, dated Oct. 10, 2008, issued in related China Application No. 200580013453.7.

Notification of Transmittal of the International Search Report and the Written Opinion of the International Searching Authority, or the Declaration issued Jun. 27, 2006 in related International Application No. PCT/US05/14557.

Notification Concerning Transmittal of International Preliminary Report on Patentability (Chapter I of the Patent Cooperation Treaty) mailed Nov. 9, 2006 in related international Application No. PCT/US2005/014557.

Supplementary European Search Report issued by the EPC on Jul. 18, 2008 in related European Application No. 05739051.0-1243.

Notice Requesting Submission of Opinion filed Nov. 15, 2007 in related Korean Application No. 10-2006-7017143.

U.S. Office Action mailed Jun. 9, 2009 in co-pending related U.S. Appl. No. 11/115,403 (4 pages).

U.S. Office Action mailed Oct. 27, 2009 in co-pending related U.S. Appl. No. 11/115,403 (27 pages).

U.S. Office Action mailed Oct. 13, 2009 in co-pending related U.S. Appl. No. 11/014,904 (6 pages).

Japan Office Action mailed on Sep. 9, 2008 and issued in related Japanese Patent Application 2003-422759 (4 pages).

Japanese Office Action mailed on Jan. 13, 2009 and issued in related Japanese Patent Application 2003-422759 (2 pages).

U.S. Office Action mailed Nov. 4, 2010 in co-pending U.S. Appl. No. 11/014,904.

U.S. Office Action mailed Oct. 17, 2008 in co-pending U.S. Appl. No. 10/733,328.

U.S. Office Action mailed Jul. 21, 2009 in co-pending U.S. Appl. No. 10/733,328.

Ryusuke Masuoka, et al., "Policy-based Access Control Task Computing Using Rei", WWW 2005, May 10-14, 2005, Chiba, Japan.

Yannis Labrou, et al., "Task Computing: Sematics-Oriented Middleware for Ubiquitous Computing", WWW 2005, May 10-14, 2005 Chiba, Japan.

Tallis, M., et al., The Briefing Associate: Easing Authors into the Semantic Web, Intelligent Systems, IEEE, IEEE, Jan. 2002 vol. 17, Issue 1, pp. 26-32 (Abstract only—1 page).

Summons to Attend Oral Proceedings pursuant to Rule 115(1)EPC mailed Dec. 15, 2010 in related European Application No. 03257974.0-1243/1431875.

U.S. Office Action mailed Sep. 13, 2010 in related co-pending U.S. Appl. No. 10/733,328.

U.S. Office Action mailed Oct. 4, 2010 in related co-pending U.S. Appl. No. 11/691,807.

U.S. Appl. No. 11/014,904, filed Dec. 20, 2004, Patrick Armstrong et al., Fujitsu Limited.

U.S. Appl. No. 11/115,403, filed Apr. 27, 2005, Yannis Labrou, Fujitsu Limited.

U.S. Appl. No. 10/733,328, filed Dec. 12, 2005, Rysuke Masuoka et al., Fujitsu Limited.

U.S. Appl. No. 11/691,807, filed Mar. 27, 2007, Yannis Labrou, Fujitsu Limited.

U.S. Office Action mailed Mar. 31, 2010 in related co-pending U.S. Appl. No. 11/691,807.

U.S. Notice of Allowance mailed Feb. 23, 2010 in related co-pending U.S. Appl. No. 11/115,403.

U.S. Supplemental Notice of Allowance mailed Apr. 8, 2010 in related co-pending U.S. Appl. No. 11/115,403.

Japanese Office Action issued on Mar. 8, 2011 in related Japanese Patent Application No. 2005-365377 (3 pages) (4 pages English Translation).

Yukinori Morita, et al., "Tool of semantic Web", Information Processing, Japan, Information Processing Society Japan, Jul. 15, 2002, vol. 43, No. 7, pp. 734-741 (10 pages) (2 pages English Translation), Partial.

U.S. Supplemental Notice of Allowance issued Jun. 2, 2011 in related U.S. Appl. No. 11/014,904.

U.S. Office Action issued Mar. 28, 2011 in co-pending U.S. Appl. No. 11/691,807.

Office Action issued Aug. 9, 2011 in co-pending U.S. Appl. No. 10/733,328.

Notice of Allowance issued Jul. 13, 2011 in co-pending U.S. Appl. No. 11/014,904.

Tadashige Iwao and Ryusuke Masuoka, "Service Compositions and Access Control for Ubiquitous Computing Environments," vol. 49, No. 4, pp. 217-224, Journal of the Operations Research Society of Japan, 2004.

Japanese Office Action issued Aug. 18, 2011 in corresponding Japanese Patent Application No. 2006-244780 (3 pages).

Tadashige Iwao and Ryusuke Masuoka, "Service Compositions and Access Control for Ubiquitous Computing Environments," vol. 49, No. 4, pp. 217-224, Journal of the Operations Research Society of Japan, 2004 (4 pages of Partial English Translation (p. 217, line 1-line 7/p. 219, left line 23-right line 16/p. 220, left line 2-p. 221 left line 21).

Japanese Office Action issued Aug. 18, 2011 in related Japanese Patent Application No. 2006-244780 (3 pages) (2 pages of English Translated Office Action (p. 1, line 12-line 16/p. 2, line 21-line 31/p. 3, line 1-line 13) of Office Action from JP Application No. 2006-244780).

* cited by examiner

STEER-WS API 120

STEER-WS API 120 is a web service. To start, launch, for example, a HostedSTEER-WS TCC 119 or other application client(s) 119. The web service is available at
http://localhost/steerws/service.asmx.
It has the following operations:

| | |
|---|---|
| addRemoteSite | Add a remote discovery module to STEER |
| checkExecutionStatus | Given an execution reference ID, find the current status of the execution. The output has the format *code\|pid\|extraInfo* where code is the execution status code (COMPELTE, ERROR, CANCEL, DONE, PREPARE, CONTROLUI), pid is the id of the process that is currently being executed, extraInfo is the control UI, or output result, or error message. |
| deleteService | Delete a given service by providing the service id. |
| executeService | Execute a single service |
| executeServiceList2 | Execute a sequence of service. As for service list, the input is like s1\|s2\|s3... for parameter pair, it can be either empty, means one-in-one-out list. Or output@number=input@number where output and input are both parameter id, number starts from 0 to the number of service - 1, means the parameter of service at the given number in the sequence. |
| executeOWLS | Execute an OWL-S description without adding it into the service knowledge base. |
| filterServicesByProperties | Filter the existing services by conditions |
| filterServicesByProperties2 | Filter a list of services by conditions |
| findAllCompositions | Find all possible compositions. |
| findAllMatchedPairs | Find all producer, consumer pairs. Designed for composition pane. |
| findAllServices | List all services. Each item has service id, service type and names (in all languages) |
| findAllServicesInSphere | Given a sphere id, find all services that are discovered by the sphere. |
| findCompositionsByTerms | Given a list of keywords, find all compositions with those keywords |
| findMatchedParameters | Given two services that can be composed, find the input and output parameters. |
| findRelatedServices | Find services that can be directly put before or after the given service. |
| findServiceCandidates | Given a list of services, find all services that can be composed with them. |
| getClassProperties | Find all properties (data and object) of a given Ontology class |
| getDirectSubclass | Find the direct sub class of a given Ontology class |
| getDirectSuperclass | Find the direct sub class of a given Ontology class |
| getNames | Given any OWL entity, find its names (in all languages) |
| getServiceDescription | Find the OWL-S description of a service |
| getServiceProperty | Find all properties of a service |
| holdDiscoveryModule | Hold a running discovery module |
| isRunning | Detect if STEER is running |
| lastUpdateTime | Find the last time when a service is added/removed. Use this to find any updates in STEER |
| listDiscoveryModules | List all running discovery modules. |
| matchByParameter | Given a URI of a parameter, find all matched parameters. (Outputs for input and vice versa) |
| matchedServiceByParameter | Given a URI of a parameter, find all matches services. |
| queryByRDQL | Execute an RDQL query over the existing service knowledge base |
| removeRemoteSite | Remove a remote site from the discovery list. |
| restartDiscoveryModule | Restart an existing discovery module |
| restoreDiscoveryModule | Start an on-hold discovery module |
| saveComposition | Save an execution plan into a new service and return the service description |
| sortServices | Given a list of services, sort them in an executable order. |
| stopExecution | Stop a running execution by providing the execution tracking ID |

Note: WSDL of the STEER TCC web service

FIG. 2

```
string newUpdateTime = lastUpdateTime ();
if (newUpdateTime != oldUpdateTime) {
      // retrieve service list, update your local knowledge
      oldUpdateTime = newUpdateTime;
} else {
      // The old service list is still valid, no need to do //
      any changes.
}
```

FIG. 3A

```
int executionID = startExecuteServiceList(serviceList);
bool InProcess = true;
string previousStatus = "";
while (InProcess) {
  string status = checkExecutionStatus(executionID);
  If (status == "DONE" or status == "ERROR") {
      // Execution is ended or stopped because of errors
      InProcess = false;
  else if (status != "" and status != previousStatus) {
      // Open status in a Web Browser for Control UI
  }
  previousStatus = status
}
```

FIG. 3B

Open My File.owlz

Page 1

| | Name | Type | Modified | Size | Ratio | Packed | Path |
|---|---|---|---|---|---|---|---|
| 502 → | Open My File.owls | OWLS File | 08/14/2006 10:37 AM | 6,989 | 84% | 1,119 | |
| 116 → | Open.owl | OWL File | 08/14/2006 10:37 AM | 5,986 | 75% | 1,476 | services\ |
| | My File.owl | OWL File | 08/14/2006 10:37 AM | 6,321 | 75% | 1,568 | services\ |
| | services.idx | IDX File | 08/14/2006 10:37 AM | 228 | 47% | 121 | services\ |
| 506 | 4 file(s) | | | 19,524 | 78% | 4,284 | |

FIG. 5B

OPEN MY FILE.OWLS    ← 502

```xml
<?xml version="1.0"?>
<rdf:RDF
    xmlns:process="http://www.daml.org/services/owl-s/1.1/Process.owl#"
    xmlns:list="http://www.daml.org/services/owl-s/1.1/generic/ObjectList.owl#"
    xmlns:swrl="http://www.w3.org/2003/11/swrl#"
    xmlns:rdfs="http://www.w3.org/2000/01/rdf-schema#"
    xmlns:owl="http://www.w3.org/2002/07/owl#"
    xmlns:j.0="http://www.general.com/tce/ontologies/2005/01/service.owl#"
    xmlns:expression="http://www.daml.org/services/owl-
s/1.1/generic/Expression.owl#"
    xmlns:service="http://www.daml.org/services/owl-s/1.1/Service.owl#"
    xmlns:grounding="http://www.daml.org/services/owl-s/1.1/Grounding.owl#"
    xmlns:rdf="http://www.w3.org/1999/02/22-rdf-syntax-ns#"
    xmlns:xsd="http://www.w3.org/2001/XMLSchema#"
    xmlns:daml="http://www.daml.org/2001/03/daml+oil#"
    xmlns:dc="http://purl.org/dc/elements/1.1/"
    xmlns:profile="http://www.daml.org/services/owl-s/1.1/Profile.owl#">
<owl:Ontology rdf:about="">
  <owl:imports rdf:resource="http://www.daml.org/services/owl-s/1.1/Profile.owl"
/>
  <owl:imports
rdf:resource="http://www.general.com/tce/ontologies/2004/03/object.owl" />
  <owl:imports rdf:resource="http://www.daml.org/services/owl-s/1.1/Service.owl"
/>
  <owl:imports rdf:resource="http://www.daml.org/services/owl-
s/1.1/Grounding.owl" />
  <owl:imports rdf:resource="http://www.daml.org/services/owl-s/1.1/Process.owl"
/>
  <owl:imports
rdf:resource="http://www.general.com/tce/ontologies/2005/01/service.owl" />
</owl:Ontology>
   <service:Service
rdf:about="http://www.general.com/STEERXT/SaveService/46ef7209g10d0d1c5656gh7eca
#Service">
     <service:presents>
       <profile:Profile
rdf:about="http://www.general.com/STEERXT/SaveService/46ef7209g10d0d1c5656gh7eca
#Profile"/>
     </service:presents>
     <service:supports>
       <grounding:WsdlGrounding
rdf:about="http://www.general.com/STEERXT/SaveService/46ef7209g10d0d1c5656gh7eca
#Grounding"/>
     </service:supports>
     <j.0:mainService></j.0:mainService>
     <service:describedBy>
       <process:CompositeProcess
rdf:about="http://www.general.com/STEERXT/SaveService/46ef7209g10d0d1c5656gh7eca
#ExecutionProcess"/>
     </service:describedBy>
```

FIG. 6A

```
[------------------------------------------------------------]
    <j.0:workflowMetaInfo>[start workflow info]                    /516
http://www.general.com/services/local/SelectFileService.owl#LocalFileURLProvider
Service   |
                            /518
http://www.general.com/services/local/OpenService.owl#OpenURLService;        /512
                              /520
    http://www.general.com/services/local/SelectFileService.owl#URLOutput@0 =
    http://www.general.com/services/local/OpenService.owl#URLInput@1;              524
[end workflow info]</j.0:workflowMetaInfo>                    /522
[------------------------------------------------------------]
  </service:Service>
  <profile:Profile
rdf:about="http://www.general.com/STEERXT/SaveService/46ef7209g10d0d1c5656gh7eca
#Profile">
    <profile:serviceName>Open My File</profile:serviceName>
    <service:presentedBy
rdf:resource="http://www.general.com/STEERXT/SaveService/46ef7209g10d0d1c5656gh7
eca#Service"/>
    <profile:textDescription></profile:textDescription>
  </profile:Profile>

[------------------------------------------------------------]
  <process:Process
rdf:about="http://www.general.com/services/local/SelectFileService.owl#LocalFile
URLProvider"/>
  <process:Process
rdf:about="http://www.general.com/services/local/OpenService.owl#OpenURL"/>
  <process:CompositeProcess
rdf:about="http://www.general.com/STEERXT/SaveService/46ef7209g10d0d1c5656gh7eca
#ExecutionProcess">
    <process:composedOf>
      <process:Sequence
rdf:about="http://www.general.com/STEERXT/SaveService/46ef7209g10d0d1c5656gh7eca
#Sequence">
        <process:components>                                                       514
          <process:ControlConstructList>
            <list:rest>
              <process:ControlConstructList>
                <list:rest rdf:resource="http://www.daml.org/services/owl-
s/1.1/generic/ObjectList.owl#nil"/>
                <list:first>
                  <process:Perform
rdf:about="http://www.general.com/STEERXT/SaveService/46ef7209g10d0d1c5656gh7eca
#Performance1"/>
                </list:first>
              </process:ControlConstructList>
            </list:rest>
            <list:first>
              <process:Perform
rdf:about="http://www.general.com/STEERXT/SaveService/46ef7209g10d0d1c5656gh7eca
#Performance0"/>
            </list:first>
          </process:ControlConstructList>
[------------------------------------------------------------]
```

FIG. 6B

```
          </process:components>
       </process:Sequence>                              /— 502
     </process:composedOf>
     <service:describes
rdf:resource="http://www.general.com/STEERXT/SaveService/46ef7209g10d0d1c5656gh7
eca#Service"/>
    </process:CompositeProcess>
    <process:Perform
rdf:about="http://www.general.com/STEERXT/SaveService/46ef7209g10d0d1c5656gh7eca
#Performance1">
       <process:hasDataFrom>
         <process:InputBinding
rdf:about="http://www.general.com/STEERXT/SaveService/46ef7209g10d0d1c5656gh7eca
#Binding1_0">
           <process:valueSource>
             <process:ValueOf
rdf:about="http://www.general.com/STEERXT/SaveService/46ef7209g10d0d1c5656gh7eca
#ValueOf1_0">
               <process:fromProcess>
                 <process:Perform
rdf:about="http://www.general.com/STEERXT/SaveService/46ef7209g10d0d1c5656gh7eca
#Performance0"/>
               </process:fromProcess>
               <process:theVar
rdf:resource="http://www.general.com/services/local/SelectFileService.owl#URLOut
put"/>
             </process:ValueOf>
           </process:valueSource>
           <process:toParam
rdf:resource="http://www.general.com/services/local/OpenService.owl#URLInput"/>
         </process:InputBinding>
       </process:hasDataFrom>
       <process:process
rdf:resource="http://www.general.com/services/local/OpenService.owl#OpenURL"/>
    </process:Perform>
    <process:Perform
rdf:about="http://www.general.com/STEERXT/SaveService/46ef7209g10d0d1c5656gh7eca
#Performance0">
       <process:process
rdf:resource="http://www.general.com/services/local/SelectFileService.owl#LocalF
ileURLProvider"/>
    </process:Perform>
    <grounding:WsdlGrounding
rdf:about="http://www.general.com/STEERXT/SaveService/46ef7209g10d0d1c5656gh7eca
#Grounding">
       <service:supportedBy
rdf:resource="http://www.general.com/STEERXT/SaveService/46ef7209g10d0d1c5656gh7
eca#Service"/>
    </grounding:WsdlGrounding>
    <owl:Ontology>
       <owl:imports
rdf:resource="http://www.general.com/tce/ontologies/2004/03/object.owl"/>
       <owl:imports rdf:resource="http://www.daml.org/services/owl-
s/1.1/Grounding.owl"/>
       <owl:imports
rdf:resource="http://www.general.com/tce/ontologies/2005/01/service.owl"/>
```

FIG. 6C

```
    <owl:imports rdf:resource="http://www.daml.org/services/owl-
s/1.1/Process.owl"/>
    <owl:imports rdf:resource="http://www.daml.org/services/owl-
s/1.1/Service.owl"/>
    <owl:imports rdf:resource="http://www.daml.org/services/owl-
s/1.1/Profile.owl"/>
  </owl:Ontology>
  <process:Result
rdf:about="http://www.general.com/STEERXT/SaveService/46ef7209g10d0d1c5656gh7eca
#Result"/>
</rdf:RDF>
```
⟵ 502

FIG. 6D

OPEN.OWL   116a

```
<?xml version="1.0" encoding="utf-8"?><!DOCTYPE uridef[
    <!ENTITY rdf "http://www.w3.org/1999/02/22-rdf-syntax-ns">
    <!ENTITY rdfs "http://www.w3.org/2000/01/rdf-schema">
    <!ENTITY owl "http://www.w3.org/2002/07/owl">
    <!ENTITY service "http://www.daml.org/services/owl-s/1.1/Service.owl">
    <!ENTITY profile "http://www.daml.org/services/owl-s/1.1/Profile.owl">
    <!ENTITY process "http://www.daml.org/services/owl-s/1.1/Process.owl">
    <!ENTITY grounding "http://www.daml.org/services/owl-s/1.1/Grounding.owl">
    <!ENTITY fla "http://www.general.com/tce/ontologies/2005/01/service.owl">
    <!ENTITY obj "http://www.general.com/tce/ontologies/2004/03/object.owl">
    <!ENTITY geoF "http://www.mindswap.org/2003/owl/geo/geoFeatures.owl">
    <!ENTITY geoC "http://www.mindswap.org/2003/owl/geo/geoCoordinateSystems.owl">
    <!ENTITY xsd "http://www.w3.org/2001/XMLSchema">
]><rdf:RDF xmlns:owl="http://www.w3.org/2002/07/owl#"
xmlns:rdfs="http://www.w3.org/2000/01/rdf-schema#"
xmlns:rdf="http://www.w3.org/1999/02/22-rdf-syntax-ns#"
xmlns:service="http://www.daml.org/services/owl-s/1.1/Service.owl#"
xmlns:process="http://www.daml.org/services/owl-s/1.1/Process.owl#"
xmlns:profile="http://www.daml.org/services/owl-s/1.1/Profile.owl#"
xmlns:grounding="http://www.daml.org/services/owl-s/1.1/Grounding.owl#"
xmlns:geoF="http://www.mindswap.org/2003/owl/geo/geoFeatures.owl#"
xmlns:geoC="http://www.mindswap.org/2003/owl/geo/geoCoordinateSystems.owl#"
xmlns:fla="http://www.general.com/tce/ontologies/2005/01/service.owl#"
xml:base="http://www.general.com/services/local/OpenService.owl#"><owl:Ontology
rdf:about=""><owl:imports
rdf:resource="http://www.general.com/tce/ontologies/2004/03/object.owl" /><owl:imports
rdf:resource="http://www.daml.org/services/owl-s/1.1/Service.owl" /><owl:imports
rdf:resource="http://www.daml.org/services/owl-s/1.1/Profile.owl" /><owl:imports
rdf:resource="http://www.daml.org/services/owl-s/1.1/Process.owl" /><owl:imports
rdf:resource="http://www.daml.org/services/owl-s/1.1/Grounding.owl" /><owl:imports
rdf:resource="http://www.general.com/tce/ontologies/2005/01/service.owl"
/></owl:Ontology><!-- Service description --><service:Service
rdf:ID="OpenURLService"><service:presents rdf:resource="#OpenURLProfile"
/><service:describedBy rdf:resource="#OpenURL" /><service:supports
rdf:resource="#OpenURLGrounding" /></service:Service><!-- Profile description --
><fla:ConsumerProfile rdf:ID="OpenURLProfile"><service:isPresentedBy
```

```
rdf:resource="#OpenURLService" /><profile:serviceName
xml:lang="en">Open</profile:serviceName><profile:serviceName
xml:lang="ja">を開く</profile:serviceName><profile:serviceName xml:lang="zh-
cn">打开</profile:serviceName><profile:serviceName
xml:lang="tr">Aç</profile:serviceName><profile:serviceName
xml:lang="es">Abrir</profile:serviceName><profile:serviceName
xml:lang="ko">열어보기</profile:serviceName><profile:serviceName xml:lang="zh-
tw">打開</profile:serviceName><profile:serviceName
xml:lang="hi">खोले</profile:serviceName><profile:serviceName
xml:lang="el">Άνοιγμα</profile:serviceName><profile:textDescription xml:lang="en">Let
you Open the specified file</profile:textDescription><profile:textDescription
xml:lang="ja">与えられたファイルを開きます。</profile:textDescription><profile:textDesc
ription xml:lang="zh-
cn">让用户打开指定的文件</profile:textDescription><profile:textDescription
xml:lang="tr">Dosya açmanızı sağlar</profile:textDescription><profile:textDescription
xml:lang="es">Permite abrir el fichero
indicado</profile:textDescription><profile:textDescription xml:lang="ko">정해진 서류를
열어보기</profile:textDescription><profile:textDescription xml:lang="zh-
tw">讓您打開一檔案</profile:textDescription><profile:textDescription xml:lang="hi">फाइल
खोल सकते है</profile:textDescription><profile:textDescription xml:lang="el">Σας δίνει την
δυνατότητα να ανοίξετε το συγκεκριμένο αρχείο </profile:textDescription><profile:hasInput
rdf:resource="#URLInput" /></fla:ConsumerProfile><process:AtomicProcess
rdf:ID="OpenURL"><process:hasInput rdf:resource="#URLInput"
/></process:AtomicProcess><process:Input rdf:ID="URLInput"><process:parameterType
rdf:datatype="http://www.w3.org/2001/XMLSchema#anyURI">http://www.general.com/tce/
ontologies/2004/03/object.owl#File</process:parameterType></process:Input><!--
Grounding description --><grounding:WsdlGrounding
rdf:ID="OpenURLGrounding"><service:supportedBy rdf:resource="#OpenURLService"
/><grounding:hasAtomicProcessGrounding rdf:resource="#OpenURLProcessGrounding"
/></grounding:WsdlGrounding><grounding:WsdlAtomicProcessGrounding
rdf:ID="OpenURLProcessGrounding"><grounding:owlsProcess rdf:resource="#OpenURL"
/><grounding:wsdlOperation><grounding:WsdlOperationRef><grounding:portType
rdf:datatype="http://www.w3.org/2001/XMLSchema#anyURI">http://www.flacp.fujitsu.com/
webservices/TCEClient/OpenFileSoap</grounding:portType><grounding:operation
rdf:datatype="http://www.w3.org/2001/XMLSchema#anyURI">http://www.flacp.fujitsu.com/
webservices/TCEClient/OpenFile</grounding:operation></grounding:WsdlOperationRef><
/grounding:wsdlOperation><grounding:wsdlInputMessage
```

```
rdf:datatype="http://www.w3.org/2001/XMLSchema#anyURI">http://www.flacp.fujitsu.com/
webservices/TCEClient/OpenFileSoapIn</grounding:wsdlInputMessage><grounding:wsdlI
nput><grounding:WsdlInputMessageMap><grounding:owlsParameter
rdf:resource="#URLInput" /><grounding:wsdlMessagePart
rdf:datatype="http://www.w3.org/2001/XMLSchema#anyURI">http://www.flacp.fujitsu.com/
webservices/TCEClient/url</grounding:wsdlMessagePart></grounding:WsdlInputMessage
Map></grounding:wsdlInput><grounding:wsdlDocument
rdf:datatype="http://www.w3.org/2001/XMLSchema#anyURI">http://192.168.4.58:8088/Se
rvice.asmx?wsdl</grounding:wsdlDocument></grounding:WsdlAtomicProcessGrounding>
</rdf:RDF>
```

FIG. 7C

MY FILE.OWL 　　　　　　　／116b

```
<?xml version="1.0" encoding="utf-8"?><!DOCTYPE uridef[
  <!ENTITY rdf "http://www.w3.org/1999/02/22-rdf-syntax-ns">
  <!ENTITY rdfs "http://www.w3.org/2000/01/rdf-schema">
  <!ENTITY owl "http://www.w3.org/2002/07/owl">
  <!ENTITY service "http://www.daml.org/services/owl-s/1.1/Service.owl">
  <!ENTITY profile "http://www.daml.org/services/owl-s/1.1/Profile.owl">
  <!ENTITY process "http://www.daml.org/services/owl-s/1.1/Process.owl">
  <!ENTITY grounding "http://www.daml.org/services/owl-s/1.1/Grounding.owl">
  <!ENTITY fla "http://www.general.com/tce/ontologies/2005/01/service.owl">
  <!ENTITY obj "http://www.general.com/tce/ontologies/2004/03/object.owl">
  <!ENTITY geoF "http://www.mindswap.org/2003/owl/geo/geoFeatures.owl">
  <!ENTITY geoC "http://www.mindswap.org/2003/owl/geo/geoCoordinateSystems.owl">
  <!ENTITY xsd "http://www.w3.org/2001/XMLSchema">
]><rdf:RDF xmlns:owl="http://www.w3.org/2002/07/owl#"
xmlns:rdfs="http://www.w3.org/2000/01/rdf-schema#"
xmlns:rdf="http://www.w3.org/1999/02/22-rdf-syntax-ns#"
xmlns:service="http://www.daml.org/services/owl-s/1.1/Service.owl#"
xmlns:process="http://www.daml.org/services/owl-s/1.1/Process.owl#"
xmlns:profile="http://www.daml.org/services/owl-s/1.1/Profile.owl#"
xmlns:grounding="http://www.daml.org/services/owl-s/1.1/Grounding.owl#"
xmlns:geoF="http://www.mindswap.org/2003/owl/geo/geoFeatures.owl#"
xmlns:geoC="http://www.mindswap.org/2003/owl/geo/geoCoordinateSystems.owl#"
xmlns:fla="http://www.general.com/tce/ontologies/2005/01/service.owl#"
xml:base="http://www.general.com/services/local/SelectFileService.owl#"><owl:Ontology
rdf:about=""><owl:imports
rdf:resource="http://www.general.com/tce/ontologies/2004/03/object.owl" /><owl:imports
rdf:resource="http://www.daml.org/services/owl-s/1.1/Service.owl" /><owl:imports
rdf:resource="http://www.daml.org/services/owl-s/1.1/Profile.owl" /><owl:imports
rdf:resource="http://www.daml.org/services/owl-s/1.1/Process.owl" /><owl:imports
rdf:resource="http://www.daml.org/services/owl-s/1.1/Grounding.owl" /><owl:imports
rdf:resource="http://www.general.com/tce/ontologies/2005/01/service.owl"
/></owl:Ontology><!-- Service description --><service:Service
rdf:ID="LocalFileURLProviderService"><service:presents
rdf:resource="#LocalFileURLProviderProfile" /><service:describedBy
rdf:resource="#LocalFileURLProvider" /><service:supports
rdf:resource="#LocalFileURLProviderGrounding" /></service:Service><!-- Profile
```

FIG. 8A

/ 116b description --><fla:ProducerProfile
rdf:ID="LocalFileURLProviderProfile"><service:isPresentedBy
rdf:resource="#LocalFileURLProviderService" /><profile:serviceName xml:lang="en">My
File</profile:serviceName><profile:serviceName
xml:lang="ja">私のファイル</profile:serviceName><profile:serviceName xml:lang="zh-
cn">我的文件</profile:serviceName><profile:serviceName xml:lang="ko">나의
서류</profile:serviceName><profile:serviceName
xml:lang="tr">Dosyam</profile:serviceName><profile:serviceName xml:lang="es">Mi
Fichero</profile:serviceName><profile:serviceName xml:lang="zh-
tw">我的檔案</profile:serviceName><profile:serviceName xml:lang="hi">मेरी
फाइल</profile:serviceName><profile:serviceName xml:lang="el">To αρχείο
μου</profile:serviceName><profile:textDescription xml:lang="en">Lets you select a local
file</profile:textDescription><profile:textDescription
xml:lang="ja">あなたのマシン上のファイルを選びます。</profile:textDescription><profile
:textDescription xml:lang="zh-
cn">让用户选取一个本地文件</profile:textDescription><profile:textDescription
xml:lang="ko">당신의 서류를 선택하실수
있읍니다</profile:textDescription><profile:textDescription xml:lang="tr">Yerel bir dosya
secmenizi sağlar</profile:textDescription><profile:textDescription xml:lang="es">Permite
seleccionar un fichero local</profile:textDescription><profile:textDescription xml:lang="zh-
tw">讓您選擇您電腦中的檔案</profile:textDescription><profile:textDescription
xml:lang="hi">इससे आप अपनी फाइल चुन सकते
है</profile:textDescription><profile:textDescription xml:lang="el">Σας δίνει την δυνατότητα
να επιλέξετε ένα τοπικό αρχείο</profile:textDescription><profile:hasOutput
rdf:resource="#URLOutput" /></fla:ProducerProfile><process:AtomicProcess
rdf:ID="LocalFileURLProvider"><process:hasOutput rdf:resource="#URLOutput"
/></process:AtomicProcess><process:Output
rdf:ID="URLOutput"><process:parameterType
rdf:datatype="http://www.w3.org/2001/XMLSchema#anyURI">http://www.general.com/tce/
ontologies/2004/03/object.owl#File</process:parameterType></process:Output><!--
Grounding description --><grounding:WsdlGrounding
rdf:ID="LocalFileURLProviderGrounding"><service:supportedBy
rdf:resource="#LocalFileURLProviderService" /><grounding:hasAtomicProcessGrounding
rdf:resource="#LocalFileURLProviderProcessGrounding"
/></grounding:WsdlGrounding><grounding:WsdlAtomicProcessGrounding
rdf:ID="LocalFileURLProviderProcessGrounding"><grounding:wsdlDocument
rdf:datatype="http://www.w3.org/2001/XMLSchema#anyURI">http://192.168.4.58:8088/Se

FIG. 8B

/ 116b rvice.asmx?wsdl</grounding:wsdlDocument><grounding:owlsProcess rdf:resource="#LocalFileURLProvider" /><grounding:wsdlOperation><grounding:WsdlOperationRef><grounding:portType rdf:datatype="http://www.w3.org/2001/XMLSchema#anyURI">http://www.flacp.fujitsu.com/webservices/TCEClient/getLocalURLSoap</grounding:portType><grounding:operation rdf:datatype="http://www.w3.org/2001/XMLSchema#anyURI">http://www.flacp.fujitsu.com/webservices/TCEClient/getLocalURL</grounding:operation></grounding:WsdlOperationRef></grounding:wsdlOperation><grounding:wsdlOutputMessage rdf:datatype="http://www.w3.org/2001/XMLSchema#anyURI">http://www.flacp.fujitsu.com/webservices/TCEClient/getLocalURLSoapOut</grounding:wsdlOutputMessage><grounding:wsdlOutput><grounding:WsdlOutputMessageMap><grounding:owlsParameter rdf:resource="#URLOutput" /><grounding:wsdlMessagePart rdf:datatype="http://www.w3.org/2001/XMLSchema#anyURI">http://www.flacp.fujitsu.com/webservices/TCEClient/getLocalURLResult</grounding:wsdlMessagePart></grounding:WsdlOutputMessageMap></grounding:wsdlOutput></grounding:WsdlAtomicProcessGrounding></rdf:RDF>

FIG. 8C

SERVICES.IDX  ← 506 http://www.general.com/services/local/OpenService.owl#OpenURLService=services/Open.owl=Open
http://www.general.com/services/local/SelectFileService.owl#LocalFileURLProviderService=services/My File.owl=My File

FIG. 9

TASK COMPUTING

CROSS-REFERENCE TO RELATED APPLICATION(S)

This application is related to, and claims the benefit of priority under 35 USC 119 to, Provisional Application U.S. Ser. No. 60/714,952, entitled TASK COMPUTING by Ryusuke Masuoka, Yannis Labrou, Zhexuan Song, and Sung Lee, filed Sep. 8, 2005 in the U.S. Patent and Trademark Office, the contents of which are incorporated herein by reference.

This application is a continuation-in-part of U.S. patent application Ser. No. 11/115,403, entitled TASK COMPUTING by Yannis Labrou, Ryusuke Masuoka, and Zhexuan Song, filed Apr. 27, 2005 now U.S. Pat. No. 7,761,885 in the US Patent and Trademark Office, the contents of which are incorporated herein by reference.

This application is a continuation-in-part of U.S. patent application Ser. No. 10/733,328, entitled TASK COMPUTING, by Ryusuke Masuoka, Yannis Labrou, and Zhexuan Song, filed Dec. 12, 2003 in the U.S. Patent and Trademark Office, the contents of which are incorporated herein by reference.

BACKGROUND OF THE INVENTION

1. Field of the Invention

The present invention is directed to real-time, dynamically composing and executing complex tasks based upon semantically described application-, device- and service-rich computing environments.

2. Description of the Related Art

Personal Computing may be referred to as a paradigm in which a user operates a single device and accesses/uses applications that reside on that device. Personal computing requires that the user has a sufficient understanding of the user's computing environment and of the applications that are available on the user's computer, so that as a knowledgeable user, the user can adequately utilize the available resources to execute complex tasks. This is computing as most users experience it on a daily basis; the burden of learning how to achieve complex tasks resides with the user, who has to understand each of the applications running on the user's machine and of the functions that the user's machine supports, to manually transfer data between applications (cut & paste), to manually invoke each application and the specific functionality that relates to the task and to eventually devote full attention (and time) to the execution of the complex task.

A shift from Personal Computing to a more task-oriented view of the computing environment, would be as follows:

For example, as one feature of an operating system, when the user inserts a music CD into the CD tray, a window pops up suggesting to the user tasks the user can perform from that point on. A typical listing of these options can include:

Play Audio CD
Copy Music from CD
Open folder to view files
Take no action

Each of these options also mentions the application to be used to perform the action. The focus is on the action, or task to be performed rather than the application used to perform the task.

However, here the operating system uses a pre-specified list of actions, or tasks, that are associated with the occurrence of a specific event (inserting a music CD, or connecting a digital camera), so that when the event occurs, the relevant listing of actions is presented to the user to act upon. In that sense, the system's response is hardwired and does not include flexibility beyond that which as been programmed into the system as to the possible actions to be performed as a result of the triggering event. In other words, the system shows the same set of the actions that can take place when a digital camera is connected to the computer; the programmer of the operating system has prepared this specific list of actions for the particular event. Applications can change the items in the list, but there is not an easy way for end-users to change it.

In another example of an operating system, the user may be presented with a choice of actions depending on a file type. That is, a separate list of tasks is presented to the user for each of the following file types: Documents, Pictures, Photo Album, Music, Music Artist, Music Album, and Videos. For example, if the file type is a picture, a list of "picture tasks" is presented:

View (pictures) as a slide show
Order prints online
Print the picture
Set the picture as background
Copy pictures to a CD This list of tasks is again pre-compiled and associated with the specific file type. There is not an easy way for end-users to modify the list.

In another example of office suite software, a smart tags feature is available. The smart tag feature highlights text in the current document while using an editor and offers the user a drop down menu of actions that can be performed with the object that that text denotes. For example, if the text represents a name, then this feature may identify the object associated with that name to be a person, and may offer the following list of possible actions:

Send mail (to that person)
Schedule a meeting (with that person)
Open Contact (of that person)
Create a Contact (for that person)

The options are enabled by identifying that the string of characters in the document might represent a name. The system relies on the syntactic features of the text to identify that this particular piece of text represents a name. However, a string of characters that does not resemble a typical American name (e.g., Lusheng Ji), may not be identified as a name related to a person. The reason is that the part of the system that identifies a piece of text as a name is a pretty simple program (script) that attempts to identify easily identifiable patterns in the syntactic form of the text. Once the "nature" of the text is identified (correctly or incorrectly), e.g., person, address, etc., a pre-compiled list of possible actions is presented to the user. It is possible for application programmers to create smart tags for other domains and applications, such as identifying addresses and invoking a map application, etc.

Another example of an attempt to present to the user a more task-oriented view of the computing environment is now discussed. When a user types an address in the search box of a search engine, the service will return (above the usual search results) a link to a mapping function that, if followed, will provide a map of the address.

However, it is not obvious that the user might be searching for the map of the typed address. Other reasonable possibilities exist: the user might want a phone number listing associated with this address, or if that address is a business, the user might want to see the BETTER BUSINESS BUREAU record for the searched business, or to check the weather in that vicinity, and so on. In its current form, the search engine guesses what type of "thing" (in this case an address) the typed text stands for and it returns a hard-wired task associated with this type of entry.

Therefore, in a task-oriented view of the computing environment, the focus is on the task that can be performed and not on the application to be used for executing the task. Moreover the user does not need to know which application will be used for the task. If the user chooses to execute one of the suggested tasks, the proper application will be instantiated accordingly and invoked (launched).

However, the computing examples mentioned above exhibit similar features that do not allow real-time, dynamic composition of executable tasks, as follows. In some manner, the type or nature of the user's input (text or event) is guessed; in effect the system attempts to infer the meaning (semantics) of a string, relying on its syntactic features. A system makes a guess of plausible tasks that the user might wish to perform given that input; that guess is hardwired into the system, so effectively it is not the system that makes the guess in real time, but it is the programmer of the system that made the guess when programming the system, way before the user interacts with the system. The appropriate application is automatically invoked upon the user's selection (whatever the user selected in a second step), instantiated with the proper input (whatever the system guessed in a first step), a static cause-effect (or trigger-response) mechanism.

Although the above computing examples can increase the user's convenience, the conventional systems still retain the following personal computing features:

The functionality has been designed into the application; the application's programmers have programmed (hard-wired) the system's response. As a result, this is not a flexible and scalable approach because the range of possibilities has been decided during design time.

The system has limited ways to accommodate the user's actions and wishes, and it cannot accurately "perceive" the nature (semantics or meaning) of the input. Despite the different technologies used in each of the examples, the system relies on correctly guessing the meaning of the input by its syntactic features.

The conventional personal computing system employs a cause-effect (or trigger-response) mechanism, in the sense that a certain type of input results to a single action (application invocation).

Also, Personal Computing, i.e., the idea of a user owning and operating a computer that runs the user's applications and "holds" the user's data is giving way to computing environments with less well-defined boundaries. As computers get permanently connected to computer networks, the distinctions between local and remote applications and data collapse, or even worse, they are confusing to computer users. Moreover, users can access and interact with devices that are not computers in the sense of personal computers but still possess significant computing power and can serve the users' goals and help them accomplish a variety of tasks (cameras, printers, smart appliances, etc.). For one thing, the average user may not even be aware of what is possible or feasible in such computing environments, as available resources (devices and applications) may be constantly changing. In other words, the personal computing approach is infeasible in a setting replete with devices and applications that are not a priori known to the user.

Accordingly, there is a need to real-time, dynamically, discover, publish, compose, manage, and execute tasks in a computing environment, often referred to as ubiquitous pervasive computing environment, which requires a fundamentally different approach to the problem of the user accomplishing tasks in the computing environment.

SUMMARY OF THE INVENTION

It is an aspect of the present invention embodiments described herein to provide a real-time, dynamically, discovering, publishing, composing, managing, and executing complex tasks based upon semantically described application-, device- and service-rich computer computing (computer system) environments. According to an aspect of the embodiments, a method, apparatus, and computer readable medium thereof, real-time, dynamical manage a complex user task of two or more services entailing a plurality of services workflows with sequences or series of events and actions, which would not be readily possible with the static or pre-specified cause-effect programming used in the conventional personal computing.

According to another aspect of the embodiments described herein a user can practically, effectively, efficiently, dynamically, in real-time, rely on a flexible and unified task user interface (discovering, publishing, composition, service and/or task management, and execution functions) to manage interaction and to interact with a pervasive computing environment. According to another aspect of the embodiments, accomplishing complex tasks (managing a series of services) relies on the user's understanding of the task on one hand and of the available resources (devices and applications) on the other, so that the user can combine them into a workflow that the user will execute and the final outcome of which will be a completed task.

BRIEF DESCRIPTION OF THE DRAWINGS

These together with other aspects and advantages which will be subsequently apparent, reside in the details of construction and operation as more fully hereinafter described and claimed, reference being had to the accompanying drawings forming a part hereof, wherein like numerals refer to like parts throughout.

FIG. 2 is a list of example definitions of the STEER-WS API, according to an embodiment of the present invention;

FIGS. 3A-3B is example computer source codes illustrating use of STEER-WS API, according to an embodiment of the present invention;

FIG. 5B is a list of files in a zipped task package, according to an embodiment of the present invention;

FIGS. 6A-6D is a computer interpretable source code of a tasklet with service workflow information, according to an embodiment of the present invention;

FIGS. 7A-7C is an example computer interpretable source code representing a semantic service description for an "open" service, according to an embodiment of the present invention;

FIGS. 8A-8C is an example computer interpretable source code representing a semantic service description for a "My File" service, according to an embodiment of the present invention;

FIG. 9 is an example of a task package index file, according to an embodiment of the present invention.

DETAILED DESCRIPTION OF THE PREFERRED EMBODIMENTS

Figure 1A:
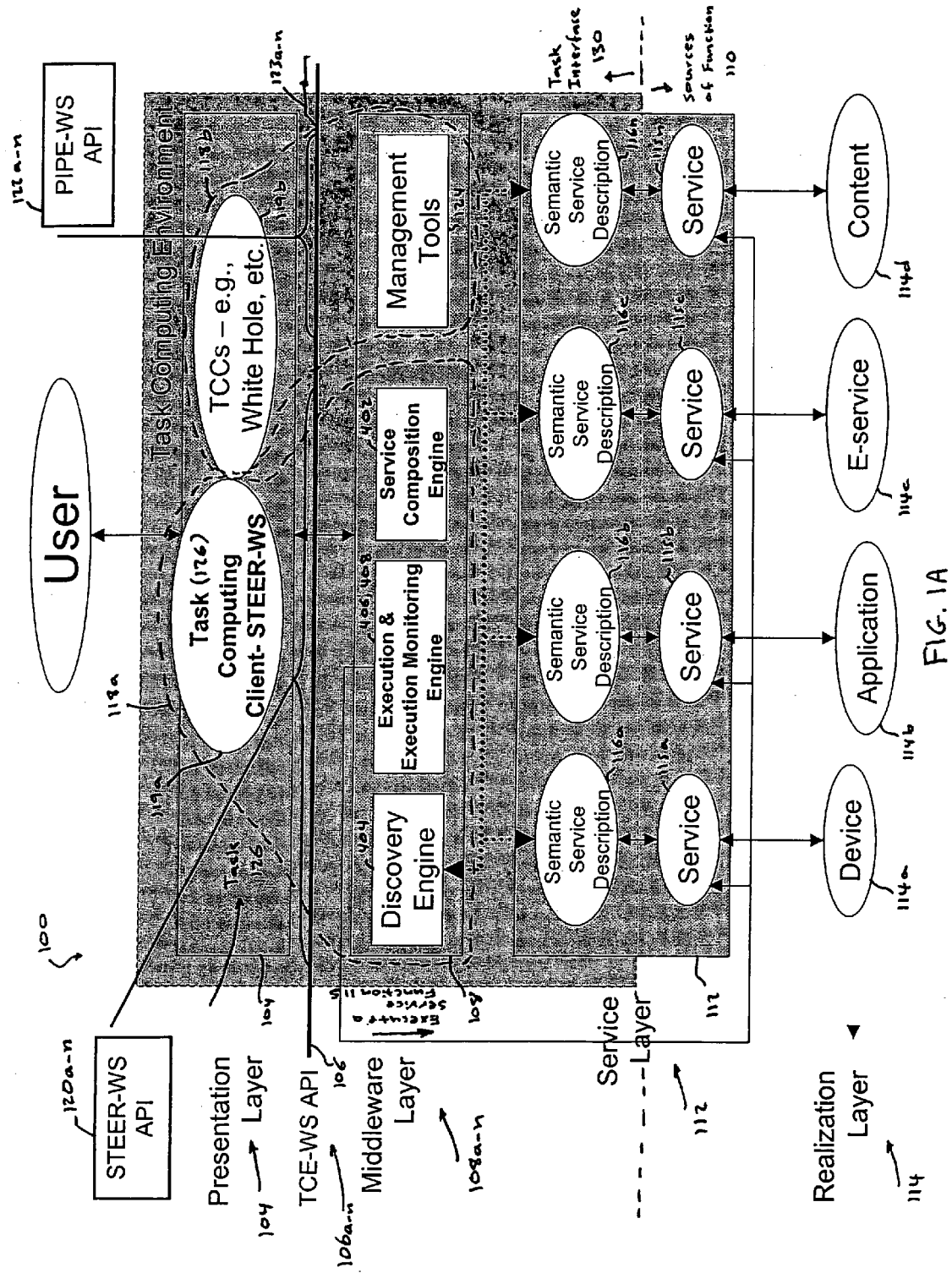
FIG. 1A is a system diagram of architecture of a TASK COMPUTING environment, according to an embodiment of the present invention.

FIG. 1A is a system diagram of architecture of a TASK COMPUTING 100 computer system(s) environment (TCE) 100, according to an embodiment of the present invention. In FIG. 1A, a computer implemented method comprises segmenting a pervasive Task Computing computer system environment 100 into a plurality of Task Computing computer system implementation tiers comprising a presentation processing layer 104, a remote procedure call mechanism application programming interface (API) 106, a middleware (server) processing layer 108 interfaced by the remote procedure call API 106 to the presentation layer 104, to real-time, dynamically generate a computer implemented task interface 130 (e.g., a software or a programmed computing hardware interface, a computer display screen graphical user interface (GUI), computer voice user interface) at the presentation layer 104 to a semantically described computer system source of function 116, as a service 112 of a computer 100, as networked, non-networked, or both 110 (computer system 110).

According to an aspect of the embodiments, the function source realization layer 114 is a computing source of functionality (e.g., a device or software 114) that represents or can present a service function 115, for example, to a user. A service layer 112 comprises a semantic service description (SSD) 116 associated with a service function 115 to semantically describe the service function 115. Thus, an SSD 116 semantically represents, or describes, the service function 115. Thus, the term "service" 112 refers to an association of an SSD 116 with a service function 115. In other words, an SSD 116 represents a "service." More particularly, the term "service" 112 refers to computational embodiments of functionality from universe of function source realization layer 114 of computer devices, computer applications/software, electronic-services and computer (or machine or both) readable content. More particularly, a service layer 112 and a function source realization layer 114 provide the semantically described computer system source of function 116 as the computer system service 112 to which the middleware processing layer 108 interfaces for real-time, dynamically composing in a computer system an executable task that comprises one or more services 112, according to the generated task interface 130 at the presentation layer 104 to one or more services 112 on the computer system 110.

Task Computing 100 is a new paradigm to real-time, dynamically, discover, publish, compose, manage, and execute complex tasks in application-, device-, electronic service-, and content-rich computer network environments 114 (i.e., execute tasks in realization layer 114). Task computing 100 is based upon semantically describing (e.g., through Semantic Service Descriptions (SSDs) 116a-n) service functions 115a-n of computing devices 114a-n that according to their semantics can be composed on-the-fly by end-users into executable tasks. Therefore, according to the embodiments described herein, Task Computing 100 system has a multi layer computer system architecture of three or more programmed computing and/or computer readable information layers (e.g., semantic instances, Semantic Service Descriptions 116) of a presentation client processing layer 104, a middleware server processing layer 108 to which the client layer 104 interfaces via a remote procedure call mechanism, and a plurality of services in a plurality of computer systems layer. The term "task" 126 refers to a composition of one or more actions according to discovered computer system services 112 that, for example, a user wants to perform. According to the embodiments described herein, a "task" 126 is automatically, user driven, or any combination thereof, is composed and managed via a computer implemented task interface 130. In case of a user, a task 126 as a composition of one or more services 112 is managed (e.g., discovered, published, composed, executed, etc.) at the presentation layer 104. In an unlimiting example, a composition of services 112, "view on projector 112 weather info 112 of business address 112 of my contact 112," is a "task" 126 that comprises four services 112 of "view on projector," "weather info," "business address," and "my contact." In other words, a "task" comprises a composition of one or more services 112.

The term "composition" refers to forming by putting together a plurality of services 112 according to provided functional characteristic(s) of services 112 as semantically described, such as (without limitation) semantic inputs and outputs of a service 112, for example, data object type for input (consumption)/output (production) of the service 112. An example of a functional characteristic of a service can be a precondition and an effect of the service 112 to determine service composability. An example of a precondition and an effect of a service 112 can be input and output data object types for a service 112.

The term "semantic instance" or "semantic object" refers to a set of descriptions on some item based on one or more ontology. A Semantic Service Description (SSD) 116 describes a service function 115 based upon one or more service function ontology.

The term "publish" refers to making the Semantic Service Description (SSD) 116 available through one or more service discovery mechanisms.

The term "semantic service description" 116 according to the embodiments refers to a vehicle to communicate parameters of a service function 115 from the service function 115 itself to an application, such as a Task Computing System (TCS) 118.

The term "discover" generally refers to discovery of a Semantic Service Description(s) 116.

TASK COMPUTING designates a type of computer system 100 that supports automatic or user driven or both (any combination thereof) real-time, dynamically, discovering, publishing, composing, managing, and executing a "task" 126 that comprises one or more services 112 based upon semantically described 116 application-, device- and service-rich computer computing (computer system) environments 110.

Two Task Computing Client embodiments referred to as Semantic Task Execution EditoR (STEER) (software to discover and compose into executable tasks the semantically described services 116) and as Pervasive Instance Provision Environment (PIPE) (software to publish and manage semantic instances and/or semantic services 116) are described in related pending U.S. patent application Ser. Nos. 10/733,328, and 11/115,403, the entire contents of which are incorporated herein by reference. The embodiments described herein relate to technologies, and/or in improvements in technologies, used for real-time, dynamic composition of semantically described services 116 into executable tasks 126 as well as management (e.g., discovery, creation/publication, manipulation, etc.) of the semantically described services 116.

In FIG. 1A, according to the embodiment(s) described herein, one or more Task Computing Systems (TCSs) 118a-n are provided according to a client-server computer system architecture based upon a remote procedure call mechanism. A TCS 118 is logically and in implementation segmented into a presentation processing layer 104 providing client type programmed processes as Task Computing Clients 119a-n and a middleware processing layer 108 providing server type programmed processes, in which the segmented presentation and middleware processing layers 104, 108 are interfaced according to any remote procedure call mechanism, such as Web services (WS) as a Task Computing Environment-Web Service Application Programming Interface (TCE-WS API) 106a-n. The concept of Web services is well known. Therefore, according to the embodiments described herein, generally a TCS 118 comprises a Task Computing Client (TCC) 119 providing client type processes at the presentation layer 104, and the TCC 119 interfaces with the middleware server processing layer 108 via a remote procedure call API, such as Web services (WS) in which case the TCC 119 is referred to as a WS TCC 119. A TCS. 118 that uses Web services, as an example of a remote procedure call mechanism, is herein referred to as WS TCS 118. By using a remote procedure call mechanism, such Web services, any application, including third party applications (e.g., MICROSOFT WORD, EXCEL, OUTLOOK, ADOBE ACROBAT, etc.) that can make a remote procedure call, such as Web service calls (or can incorporate remote procedure invocation capability) could become a Task Computing Client (TCC) 119. The embodiments described herein use Web services as an example of a remote procedure call mechanism, however, the present invention is not limited to such a configuration and any remote procedure call mechanism can be used.

Therefore, using Web services as an example of a remote procedure call API, Semantic Task Execution EditoR-Web Services Task Computing System (STEER-WS TCS) 118a is an example of a WS TCS 118, which comprises a STEER-WS Task Computing Client (STEER-WS TCC) 119a at the presentation processing layer 104 interfaced, via a STEER-WS API 120, with the middleware server processing layer 108.

A Pervasive Instance Provision Environment-Web Services Task Computing System (PIPE-WS TCS) 118b is another example of a WS TCS 118. A PIPE-WS API 122 exposes middleware server management tools 124 that are generally used for managing (e.g., creating/publishing, removing, manipulating, etc.) semantic object instances and/or SSDs 116 used in Task Computing 100 as well as managing tasks 126. An application client 119 that uses PIPE-WS 122 is herein referred to as a Semantically Described Service Control Mechanism (SDSCM) 119b, examples of which are "White Hole" 119b-1, "Service Manager" 119b-2, "Real-world object semanticizer 119b-3, and database semanticizer 119b-4, described in the related pending U.S. patent application Ser. Nos. 10/733,328, and 11/115,403. For example, a WS TCS 118b that uses PIPE-WS 122 comprises a Web services Task Computing Client (application client) or SDSCM 119b, such as "White Hole" Task Computing Client ("White Hole") 119b-1, at the presentation processing layer 104, which interfaces via the PIPE-WS API 122 with the middleware server processing layer 108.

Through the use of Web services Task Computing Clients (WS TCCs) 119, such as (without limitation) STEER-WS TCC 119a, and White Hole 119b-1, "Service Manager" 119b-2, "Real-world object semanticizer 119b-3, and database semanticizer 119b-4, as programmable computing components (e.g., Task Computing Client software) at the presentation layer 104, users can manage (e.g., discover, publish, compose, execute, manipulate) tasks 126 based upon semantically described services 116 made available by the middleware server processes 108 through TCE-WS API 106 in any one or a plurality of computing environments.

In FIG. 1A, according to today's computing environments, a user is surrounded by functionality referred to as the realization layer 114, which comprise devices or computer-mediated services, such as electronic services (e-services) available over the Internet, applications that run on computing devices that the user operates, content available on a computer readable medium, or simply devices that support a specific function. Examples of such devices, application, e-services, and content, include (without limitation) telephones, computer displays, cameras, entertainment devices/centers, televisions, Personal Digital Assistants (PDAs), radio communication devices (e.g., mobile phones, etc.), audio players, fax machines, printers, weather services, map services, office suite computing software (e.g., email application, address book, etc.), multimedia computer readable media (e.g., music compact disc, movie digital video disc (DVD), etc.), Internet sites, databases, etc.

In FIG. 1A, the functionality or service functions 115a-n presented by the realization layer 114 can comprise, for example, (without limitation) listening to music (e.g., in case of an entertainment device), downloading songs, watching streaming videos, listening to radios, providing contact information, checking addresses on a map, etc. Conventionally, the realization layer 114 has been designed to provide functionality to the user by means of the user interacting with (and/or operating) each device or service; for example if the user want to call a colleague with the phone provided in the room she is visiting and the phone number of the colleague is stored in the user's electronic address book application on the user's laptop, the user must start laptop application, look-up the phone number in question and then dial the phone number manually on the phone. In other words, a user cannot compose a task 126. Even when the applications, e-services and devices can physically communicate with one another, i.e., a communication link among them exists, they cannot exchange data in a way that is meaningful to the user's task, unless the designers of the realization layer 114 have designed the computer system source of function, for example, a computing device, with that specific task in mind. When faced with plethora of sources of functions 114a-n, the user cannot perform tasks that utilize functionalities from all these sources, unless the sources of functions 114a-n have been designed for that task. Moreover, the casual user is often not unaware of what such tasks are possible.

In FIG. 1A, according to the embodiment described herein, the service layer 112 comprises a service function 115a from the function source realization layer 114 and a semantic service description 116a correspondingly semantically describing the service function 115a of the function source realization layer 114, as the service 112 of the computer system (as networked, non-networked, or both) 110. According to an aspect of the embodiments described herein, the relationship between service function 115 and SSD 116 can be many to many (n:m) for a particular function source 114. For example, one SSD 116 to a plurality of service functions 115 where one saves a service function 115 composition (with a plurality of service functions 115 in the composition) as an SSD 116. And one service function 115 to many SSDs 116, where one gives a plurality of kinds or types of semanticization of a singe service function 115. For example, in a case where a book lookup service function 115 (which returns authors, prices, photos, etc. for an ISBN input) can be grounded by semantic services 116 such that one returns the author contact, and another SSD 116 returns an image, etc. More particularly, according to the embodiments described herein, a service layer 112, comprises service functions 115*a-n* available by the realization layer 114*a-n* and Semantic Service Descriptions (SSDs) 116*a-n* corresponding to the service functions 115*a-n*, together forming available computer system (as networked, non-networked, or both) 110 services 112. The SSD 116 exposes on a computer network a service function 115 of a realization layer 114. Certain embodiment(s) of SSD 116 is/are described in the related pending U.S. patent application Ser. Nos. 10/733,328, and 11/115,403, the entire contents of which are incorporated herein by reference.

Therefore, Task Computing 100 is a new paradigm for how a user interacts with service functions 115*a-n* of realization layer sources of functions 114*a-n*, for example, a computing device 114, that emphasizes a task 126 that the user wants to accomplish while using the computing device 114 rather than emphasizing the specific means for how to accomplish the task. Task computing 100 fills the gap between what users want done and a service function 115 of a computing device 114 that might be available in their environments. Task computing 100 presents substantial advantages over traditional approaches, such as the current personal computing paradigm, namely, it is more adequate for non-expert computer users, it is a time-saver for all types of users and is particularly suited for the emerging pervasive computing type of computing environments.

In FIG. 1A, therefore, according to the embodiments described herein, to provide a computer system architecture (software and/or programmable computing hardware) that would be flexible to extend and build upon, a distinct and modularized middleware server processing layer 108 is created whose functionality is made available to the presentation processing layer 104 through remote procedure call application programming interfaces (APIs) 106; so that application developers and users can use them to access Task Computing functions, such as service 112 discovery and composition into executable tasks 126, including construction, save, execution, monitoring, publishing, management, etc. of services 112 and/or tasks 126. A remote procedure call mechanism, such as for example Web services, provides location (i.e., different processing layers on different computers), platform, and programming language independence required for end-user application development.

As discussed above, ubiquitous pervasive networked computer computing environments are populated by a multitude of devices and other functionality (e-services, applications, content) 114, 115 that is often transient in nature; moreover, end-users, or even, developers that are creating an application for a ubiquitous environment might not know in advance what functionalities (resources) 114 and corresponding service functions 115 could be available at a given time and more importantly what they can be used for. To take advantage of this dynamism, it is necessary that service functionalities 114, 115 can be discovered and combined at runtime rather than design time. Therefore, the embodiments described herein use, as an example, Semantic Web technologies, because if computer network resources 114, 115 are sufficiently self-described by machine-readable semantics 116, it is possible to build an infrastructure 100 that understands enough about the resources 114, 115, as computer system services 110, to permit end-users do what application developers typically do by bringing their own understanding of what resources 114, 115 provide and can be used for. The concept of Semantic Web is well known.

More particularly, according to the embodiment(s) described herein, the Task Computing 100 utilizes the well known concepts of Semantic Web and Web services. However, to deliver a real, functioning system in a truly dynamic and ad-hoc ubiquitous computing environment, according to the Task Computing 100 described herein, the following are established and implemented:

(1) As shown in FIG. 1, providing a task interface 130 to computer system sources of functions 110. The task interface 130 comprises a Task Computing System (TCS) 118 logically segmented into (1) a presentation processing layer 104 that comprises a Task Computing Client (TCC) 119 and (2) a middleware server processing layer 108 to which the TCC 119 at the presentation layer 104 interfaces with a remote procedure call mechanism API 106, such as Task Computing Environment (TCE) Web Services API 106 (for example, STEER-WS API 120 and the PIPE-WS API 122). The API 106 exposes the middleware server processing layer 108 to be interfaced by the presentation processing layer 104. The task interface 130 also comprises a Semantic Service Description (SSD) 116 layer that semantically describes service functions 115. An SSD 116 is discovered by the middleware processing layer 109 to be presented at the presentation layer 104 via a TCC 119 and a service function 115 is executed, for example, as part of a task 126 to be executed, by the middleware processing layer 108 according to a control command provided, for example, at the presentation layer 104 via the TCC 119 and based upon the SSD 116 for service function 115 to be executed.

(2) Separation of semantic service descriptions (SSDs) 116 and service implementations 115 to provide together a service layer 112;

(3) Separation between discovery (of a service or a saved task, as the case may be) mechanisms and discovery ranges, and manipulation capability of services 112 within and between those ranges by conceiving a concept of "sphere" as a subset of remote procedure call API running on computers 110 and accessible by remote Task Computing Clients 119 to achieve discovery ranges for services 112.

(4) Ability for users (and applications) to dynamically create and manipulate services 112 that can be made available and shared with others (or made unavailable when necessary) (i.e., provide service control management); and (5) Providing a variety of services 112 that enable interesting and truly useful tasks 126.

Therefore, as shown in FIG. 1A, the separation of the above-described layers is both logical (conceptual) and in implementation, useful in building a Task Computing 100 where the user can perform complex tasks that have not been (neither implicitly nor explicitly) designed into the computer network system, thus multiplying the uses of the sources of functionality 114, 115 (devices, applications, content and e-services). The present invention is not limited to the Semantic Web and other semantic type technologies or framework that allows data to be shared and reused across application, enterprise, and community boundaries can be used by the embodiments described herein.

In FIG. 1A, the function source realization layer 114, as the bottom most layer encompasses the universe of computer devices, computer applications/software, electronic-services and computer (or machine or both) readable content, where all functionality available to the user originates. Service functions 115 (described in more detail below) of the function source 114 are computational embodiments of functionality. Such service functionality 115 generally emanates from at least three different types of sources 114: devices, applications (software) and over-the-Web e-services. These three sources 114 are loosely defined and unlimiting categories, because the boundaries between them can be highly malleable. In an example, device 114 originating services 115 are the core functionality that the device 114 is designed to deliver. For example, a phone's (device) 114 main functionality is making phone calls (service) 115. Similarly, application (software) 114 originating functionalities are service functions 115 of the software 114 that is executing on a computing device 114. For example, a personal information management (PIM) application's functionalities, includes storing and retrieving contact information of persons. Finally e-services and/or content(s) 114 service functionality 115 is, for example, a service function 115 that is executing on some remote server to deliver the service functionality 115 through access to the Web, beyond the boundaries of a user's local network. Contents as a fourth source of functionality 114 can be very useful, namely content that is made available as a service function 115; this type of service function 115 can be very convenient as an information-sharing mechanism between users. Therefore, "services" 112 herein refers to computational embodiments of functionality from universe of function source realization layer 114 of computer devices, computer applications/software, electronic-services and computer (or machine or both) readable content. Therefore, a "service" 112 as a computational embodiment of functionality from a function source realization layer 114 has interface characteristics for interacting with the "service" 112, which can comprise a description of the "service," including name of the service, function(s) performed, etc., and functional characteristics of the service, such as input/output to the "service" 112. Further, according to the embodiments described herein, a computer implemented user interface to a computer system service 110 is according to ontology based semantically described input data and output data of a "service" 112. For example, a service 112 described in a Semantic Service Description (SSD) 116 to display a file on display projector can be named "View on Projector," which accepts a "File" as input and no output parameter.

In FIG. 1A, the service layer 112 is sources of functionality 114 made computationally available as service functions 115 via Semantic Service Descriptions (SSDs) 116. The SSDs allow discovery and access to (execution of) the service functions 115. Each service function 115 is associated with at least one Semantic Service Description (SSD) 116, which, for example, is encoded according to OWL-S, which is a Web service ontology language based upon Web Ontology Language (OWL) using the Resource Description Framework (RDF)/Extensible Markup Language (XML) exchange syntax, and a SSD 116 can be created on-the-fly, via PIPE-WS TCC 118*b*, as services 115 might be created (made available) dynamically. The SSD embodiment described is not limited to an OWL-S implementation and any computer interpretable language construct for describing properties and capabilities of computer system service functions 115, including Web services, can be used. The SSD 116 comprises three parts: profile, process and grounding, where the profile part allows users to manipulate the service 115 in semantic layer and the grounding part allows users to actually invoke services 115. Services 115 represent available functionality in the Task Computing universe 100, and SSDs 116 of these services 115 are meant to shield the user from the complexity of the underlying sources of service functionality 115 and make it easy for the user to employ these service sources 115 in accomplishing interesting and complex tasks. An embodiment(s) of Semantically Described Services 116, is described in related pending U.S. patent application Ser. Nos. 10/733,328, and 11/115,403, the entire contents of which are incorporated herein by reference.

In FIG. 1A, middleware server processing layer components 108 are responsible for discovering services 115, 116 (or 112), deciding how services 115, 116 can be composed into executable tasks, executing the services and monitoring service execution, and enabling and facilitating a variety of management operations, including the creation and publishing of semantically described services 116. In other words, the purpose of the middleware processing layer components 108 is to abstract all service resources 115 as semantically-described services 116 that can be made available (e.g., at the presentation layer 104 via TCCs 119) to either users or the applications that seek to manipulate them.

In FIG. 1A, the presentation processing layer 104 utilizes the capabilities of the middleware processing layer 108 to enable users to execute tasks by combining all available service functionality 116, 115 (112). A variety of programmable computing clients (e.g., software clients, programmable computing hardware clients, or both, etc.) using Web services 118*a-n*, referred to as WS TCCs, WS applications, and/or WS web-based interface applications (accessible with a web browser) (herein all referred to as a WS TCC) are provided to execute tasks by combining all available service functionality 112 via the middleware processing layer 108. According to an embodiment described herein, the middleware layer components 108 are exposed through well-defined Web services application programming interfaces (WS APIs) 106, thereby allowing creation of WS Task Computing Clients (WS TCCs) 119 that utilize these APIs 106.

Defining the task computing environment Web services APIs 106 at the middle processing layer 108 for unrestricted accesses to the core functionalities of Task Computing, such as service 112 discovery, composition, execution, save, creation, management, opens a whole array of possibilities. For example, WS TCCs 119 are not bound to a particular implementation of Task Computing modules, as long as a user can make Web Service 106 calls, the user can work on any platform and use any programming language to create WS TCCs 119 and access services 112.

In FIG. 1A, therefore, according to the embodiments described herein, a Task Computing Environment-Web Services (TCE-WS) API 106 is provided. Subsets of the TCE-WS API 106 can be used for various task computing purposes, and herein are referred to as STEER-WS API 120 when used in the STEER-WS TCS 118*a*, PIPE-WS API 122 when used in one or more PIPE-WS TCSs 118*b*, and Sphere of Management (SoM)-WS API 123 when used to provide a "Sphere" for cross-environment task computing (as discussed in more detail below). According to the embodiments of the present invention, herein will be described the following:

Herein will be described in more detail various Web Services Task Computing Client (WS TCC) 119*a* embodiments, such as Semantic Task Execution EditoR-Web Services (STEER-WS TCC) 119*a*, which is based upon the STEER-WS API 120 and is software to discover and compose into executable tasks the semantically described services 116. A STEER-WS TCC 119*a* as a presentation layer 104 component of a WS TCS 118 provides a variety of computer implemented user interfaces. The related pending U.S. patent application Ser. Nos. 10/733,328, and 11/115,403 describe a computer displayed graphical user interface referred to as STEER-WS-Extended (XT) TCC 119*a-1*, a computer displayed graphical user interface embodied in a radio device, such a mobile phone, and referred to as Mobile-PhoneSTEER-WS TCC 119*a-2*, a STEER-WS-Spatial Information System (SIS) TCC 119*a-3*, a VoiceSTEER-WS TCC 119*a-4*, and a Tasklet-WS TCC 119a-5. The Tasklet-WS TCC 119a-5 according to the embodiments of the present invention will be described herein.

Figure 1B:
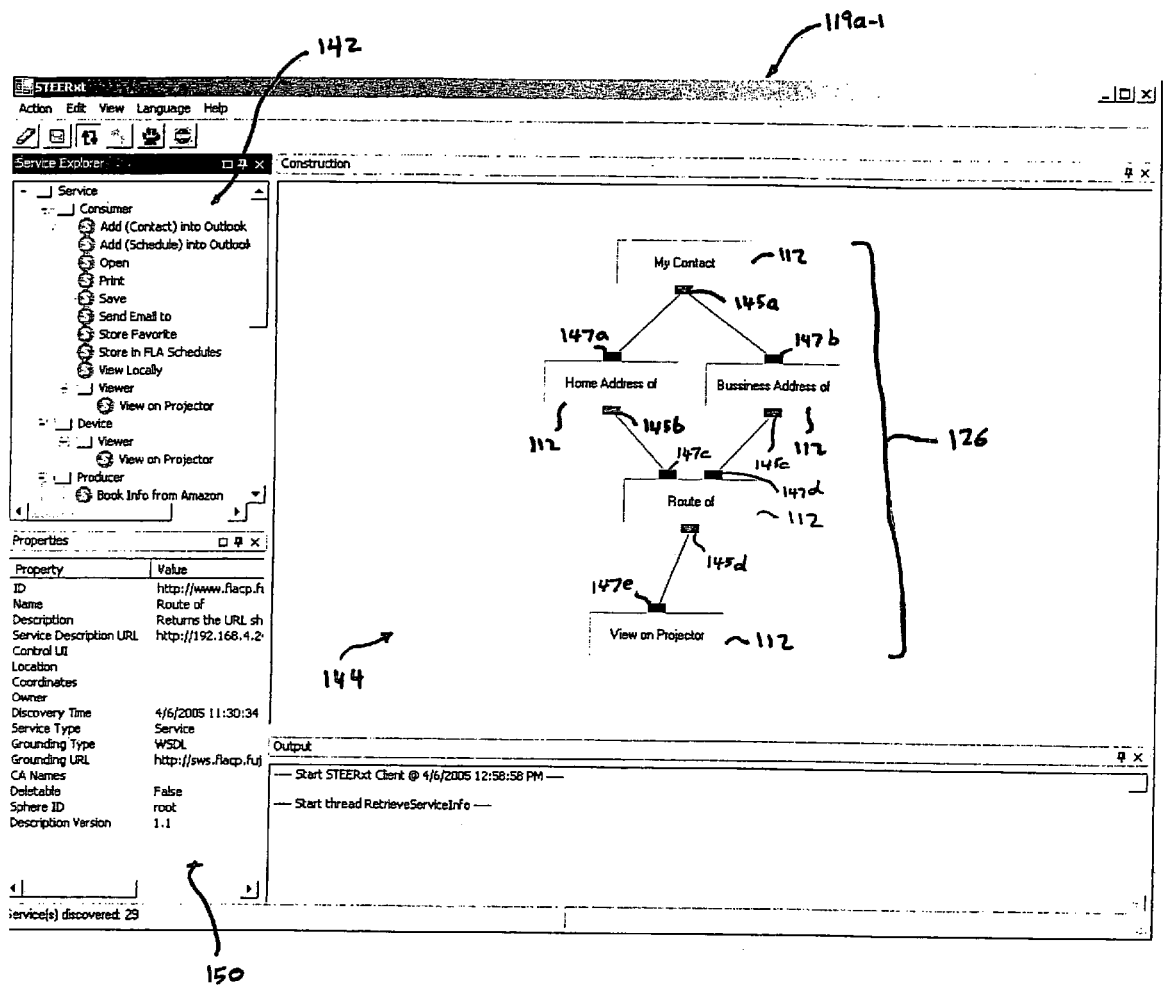
FIG. 1B, is an image of a computer displayed graphical user interface as a computer implemented task interface at the presentation layer, according to an embodiment of the present invention.

User Interface—STEER-WS-XT TCC 119a-1:

FIG. 1B, is an image of a computer displayed graphical user interface as a computer implemented task interface by STEER-WS-XT TCC 119a-1 at the presentation layer 104, according to an embodiment of the present invention. In FIG. 1B, a computer displayed graphical user interface window 142 is a discovered service 112 window (or discovery pane) 142 that displays according to an icon tree structure discovered services 112. According to an aspect of the embodiments described herein the services 112 are organized in the discovered service window 142 according to any type of hierarchical category of services 112 based upon ontology and/or other categorizations, such as (without limitation) friendly names, type of service, alphabetical order, etc. A computer displayed graphical user interface window 144 is a task window (or task 126 construction pane) 144, which is a directed service 112 graph accommodating a non-linear composition of services 112 for multiple inputs/outputs. In FIG. 1B, the task 126 window 144 displays in an unlimiting example a task 126 that comprises five services 112. In particular, the task 126 is "view on my projector 112 a route of 112 of home address 112 and business address 112 from my contact 112."

In FIG. 1B, according to an aspect of the embodiments described herein an SSD 116 window 150 displays SSD 116 parameters/properties for a selected service 112 in the service window 122. The SSD window 135 can be useful, for example, in testing a task 126 as part of composing a task 126.

In FIG. 1B, the task window 144 provides selectable graphical displays of services 112 that have been selected in the discovered services window 142. In the task window 144, upon selection of a discovered service 112, compatible services according to service's functional characteristic based upon ontology are automatically identified, and a graphical display of the service 112 also automatically comprises one or more selectable functional characteristic buttons 145a-n representing available or valid (compatible) services 112 for the selected discovered service. Selection of a functional characteristic button displays a selectable list of other discovered services 112 that can consume produce of a preceding service 112, whereby composition of one or more services 112 together, as indicated by displayed lines connecting the graphical displays of services 112, creates a task 126. More particularly, in the task window 142, a user composes a directed service 112 graph as a task 126. In case of using input/output data object type of a service 112 as functional characteristics of the service 112, an output functional characteristic button 145a is differentiated from an input functional characteristic button 147a by color or any other known computer display differentiation methods.

With reference to FIGS. 1A and 1B, Task Computing 100 system has an architecture that provides a foundation for finding the services available in the current environment, constructing and manipulating a user-centric task view of the available services, and executing the resulting tasks composed of multiple services. It even lets the end-users dynamically and easily create new services as necessary. Three characteristics/elements of Task Computing 100 system are as follows:

(1) Uniform abstraction of all functionality 114, 115 as services 112. As discussed herein, in Task Computing 100, the middleware server processing layer 108 serves to abstract all resources as semantically described services 112. A semantically described service is a service function 115 available through remote procedure calls, such as (without limitation) WSDL (Web Service Description Language), a UPnP (Universal Plug and Play), CORBA, RMI, RPC, DCE, DCOM service functions 115) for which a semantic description (a file) 116 in a language intended for describing services (for example OWL-S) has been specified. When specifying such semantic descriptions 116, a specified ontology is specified for the domain that the service 116, 115 (112) act upon. Regarding ontologies, software tools can be used to create ontologies and whenever possible existing or available ontologies can be used. The OWL-S service descriptions 116 express a functional characteristic of a service function 115 being semanticized, for example, the input and output, as semantic objects, and the owner, creator, location, etc. of the service 112. The description also includes grounding information so that the actual WSDL and/or UPnP service can be properly executed. In providing these descriptions semanticizer tools, such as (without limitation) real-world object semanticizer 119b-4, database semanticizer 119b-5, internal service instance creator, etc. described and/or referred herein, have been used for mapping ontology objects to WSDL parameters and creating any necessary grounding (grounding is expressed through XSLT scripts). Web Service interfaces 106 have been provided for the middleware server processing layer 108 based upon which an intuitive task 126 user interface at the presentation client processing layer 104 is provided.

The Task Computing middleware can also be viewed as a dynamic repository of semantic service descriptions. Apart from the APIs 106 for accessing and manipulating these descriptions, which are discussed herein, means is provided for querying this repository directly by implementing a API that will process any RDF Query Language (RDQL) query against the service descriptions (JENA 2.0 is used as an example for the processing of RDQL queries). For example the developer could filter the services presented to the user for task composition by some feature of the services, such as location, even though an explicit API for that purpose is not provided. This capability extends the power of the application developer and as certain queries become more useful they can be permanently added to the middleware as APIs 106 that execute pre-specified RDQL queries. According to an aspect of the embodiments, discovered SSD are dynamically filtered discovered services based upon relevance of the discovered services to the user and the user context by examining the semantic description of the service in an SSD, based upon the discovery mechanism that discovered the SSD, or based upon service compatibility according to SSD defined functional characteristic of each service, or any combinations thereof.

Abstraction of functionality as services 112 makes functionality universally accessible and allows the Task Computing infrastructure to interact with such functionality. A Task Computing 100 system transforms the functionality 114, 115 of the user's computing device (from applications and OS), of the devices in the environment, and of the available eservices on the Internet, into abstracted services 112. This abstraction paves the way for having fewer pre-arrangements to deal with the functionalities available in the environment, but by itself alone might not suffice to provide user real-time manipulation and composition of functionalities into tasks 126, so that the embodiments described herein also provide a presentation layer 104 to support real-time, dynamic management of a task 126 that comprise a plurality of services 112.

(2) Provide intuitive (to a user and/or a system) manipulation of abstracted services 112 based on semantic service descriptions (SSDs) 116. Intuitive manipulation of services 112 is made possible through the use of Semantic Service Descriptions (SSDs) 116; ontologies are the mechanism for achieving such a user and/or system intuitive manipulation. The concept of SSD 116 is described in related pending U.S. patent application Ser. Nos. 10/733,328, and 11/115,403, the entire contents of which are incorporated herein by reference.

If, for example, instead of SSD 116, only WSDL (Web Service Description Language) source of function 115 is used to describe the functional characteristics of a Web Service, the WSDL-described Web Services requires that programmers understand their semantics (beyond the WSDL descriptions) and develop the code to use the services in the right way. As a result, end-users' interaction with functionalities is limited by the scope of these programs in ways predefined by the developers. The additional semantics (supplied in an SSD 116) by mapping ontology objects to source of function 115 parameters, such as (without limitation) WSDL parameters, and creating any necessary grounding, allows the Task Computing 100 infrastructure to help users manipulate the services without this deep knowledge. For example, semantics can be used to constrain the manipulation of services by users, or to present the user possible tasks 126 in the current environment. If only WSDL is relied upon for a service composition based on semantic inputs and outputs of services, the composition would not be restricted to any compositions of a service that produces, for example, an XML Schema Definition (XSD) string with another one that consumes an XSD string, thus possibly leading to non executable (or invalid) service compositions. Therefore, according to the embodiments described herein, a "composition" refers to forming by putting together a plurality of services 112 according to provided functional characteristic(s) of services 112 as semantically described, such as (without limitation) semantic inputs and outputs of a service 112, for example, data object type for input (consumption)/output (production) of the service 112. An example of a functional characteristic of a service can be a precondition and an effect of the service 112 to determine service composability. An example of a precondition and an effect of a service 112 can be input and output data object types for a service 112. In particular, the SSDs 116 of services 112 provide finer granularity of the services inputs and outputs, so that, for example, a service that generates an "Address" semantic object will only be composable with semantically compatible services.

Another mechanism of providing user intuitive manipulation of services 112 is by giving appropriate service names according to a natural language, such as a "Route from My Home to" service name, the composed service names of compatible services can serve as a natural language task 126 representation(s) (for example, "View on Projector" 112+ "My File", 112 "Route from Company-1 to" 112 "A City Name Airport" 112). Ontologies can also support mechanisms, such as compositions based on subclass-super-class relationships, and semantic object translations that are very natural for end-users. Therefore, composition of a task 126 is based upon a natural language sentence, or in other words a composed task 126 reads like a natural language sentence. More particularly, the embodiments described herein provide assigning a name to the service as an element (e.g., a phrase) of a natural language sentence to support composability of the services to map into composability of natural language elements as a natural language sentence. Therefore, Task Computing 100 system allows very rich and interesting ways for the end-users to interact with the services of the environment 110.

(3) A user can guide a real-time and/or dynamic (late binding type) composition of a task 126 via a computer implement user interface based upon (1) and (2), for example, as shown in FIG. 1B.

TCE Web Service Application Programming Interface (TCE-WS API) 106:

FIG. 2 is a list of example definitions of the STEER-WS API 120, according to an embodiment of the present invention. In FIGS. 1A and 1B, STEER-WS TCC 119a is a WS TCC 119 that provides a convenient user interface to discover and filter services 112, compose, execute and save the services 112 as tasks 126. The STEER-WS API 120, which is a TCE-WS API 106, extracts Task Computing functionalities into independent modules and exposes them as standard Web service interfaces accessible by any WS TCC 119, such as for example the STEER-WS TCC 119a.

As shown in FIG. 2, by exposing the functionalities of Task Computing middleware server processing layer 108 by Web services 106, a WS TCC 119 at the presentation processing layer 104 can be freed from the implementation of the modules of the Task Computing middleware server processing layer 108. A WS TCC 119 developer can use any programming language on any operating system as long as Web Service 106 calls can be made, thereby providing a WS TCC 119. Even third party applications (MICROSOFT WORD, EXCEL, OUTLOOK, ADOBE ACROBAT, etc.) that can make Web Service calls (or can incorporate Web services invocation capability) could be a potential WS TCC 119.

In FIG. 2, functionalities, such as discovery, composition, execution, monitoring, save and so on are supported in STEER-WS API 120. Generally, the TCE-WS API 106, such as STEER-WS API 120 and PIPE-WS API 122, rely on a Service 112 identifier (SID) parameter which is something that uniquely identifies a semantically described service function 115 described in an SSD 116. Typically, according to the embodiments described herein, SID is a string of a Uniform Resource Locator (URL) to the semantically described service function 115 described in the SSD 116. For example, FIG. 3A shows an example computer source code 300 that uses STEER-WS API 120 to synchronize the local knowledge about discovered services 112. FIG. 3B shows another example computer source code 310 of using STEER-WS API 120 to invoke tasks 126 with multiple services 112. In an unlimiting example, in FIG. 3B, ServiceList parameter is the input string that, for example, uses "&" to delimit multiple tasks and uses "|" to delimit service 112 identifiers within a task, and a WS TCC 119 can have the program loop of FIG. 3B in its own code to invoke and monitor a task execution. Therefore, in the present invention, the source codes, such as FIGS. 3A-3B, which utilize TCE WS API 106 to invoke remote procedures in the middleware server processing layer 108, are embodiment implementations of WS TCCs 119, such as STEER-WS TCC 119a.

Figure 4:
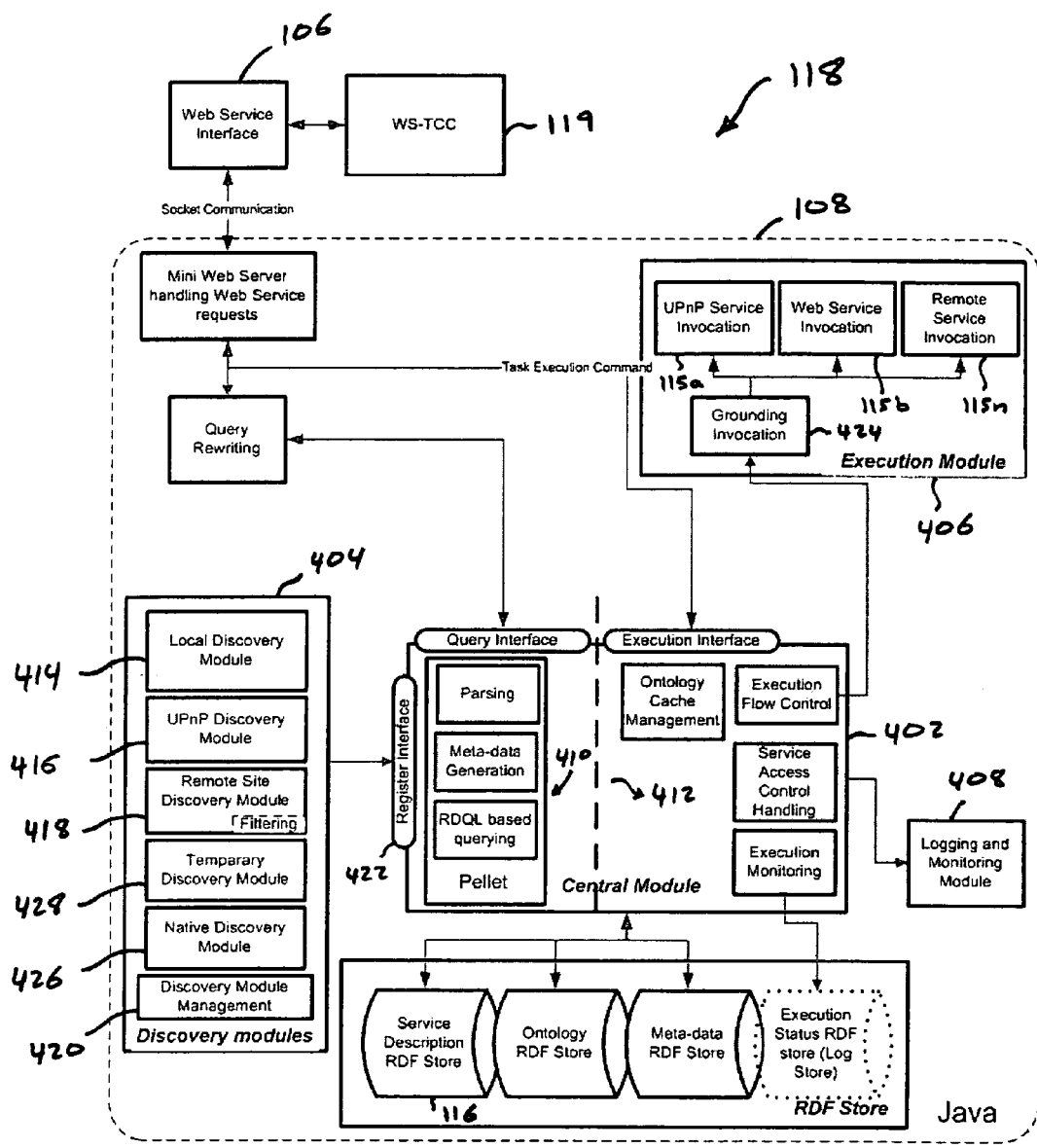
FIG. 4 is a functional block diagram of middleware processing layer 108 program modules, according to an embodiment of the present invention.

FIG. 4 is a functional block diagram of middleware server processing layer 108 program modules of STEER-WS TCC 119a, according to an embodiment of the present invention. As shown in FIGS. 1 and 4, the middleware processing layer 108 of the STEER-WS TCC 119a comprises a central module 402 that controls, according to Web services 106 requests via the STEER-WS API 120 from the presentation processing layer 104, service 112 discovery modules 404, execution modules 406, and monitoring modules 408. The central module 402 comprises service 112 parsing and indexing modules 410 and service 112 composition and task 126 execution planning 412. The service 112 parsing and indexing modules 410 provides a registering interface 422, which allows discovery modules 404 to register/unregister discovered services 112. Discovery modules 404 comprises a set of individual discovery modules, such as local discovery module 414, any third party service function 115 discovery module 416, such as UPnP, remote site discovery modules 418, and a discovery module management 420 that has a management function of determining whether each discovery module should be used or not in a different environment 110.

According to an aspect of the embodiments described herein, the service discovery modules 404 discover service functions 115 by discovering associated SSDs 116 according to a plurality of discovery mechanisms comprising one or more of a local service discovery 414, third party service discovery 416, remote site service discovery 418, temporary service discovery 428, or native service discovery 426, or any combinations thereof. The local service discovery 414 opens a "socket" port and listens for an SSD 116 publish message from an application launched on same apparatus (computer) on which the local service discovery module 414 is being executed. For example, when an application launches, the application published certain SSDs 116 and sends an SSD published message to a predefined "socket" port opened by the local service discover 414 to receive communication. According to an aspect of the embodiments, the SSD published message received by the local service discovery 414 from the application contains location(s) of the published SSDs 116. Then, the local service discovery module 414 makes the SSDs 116 available to a TCC 119.

The third party discovery 416 uses a third party discovery standard to discover SSDs 116. The third party discovery mechanisms 416 can be, for example, as Universal Plug and Play (UPNP) technology, JINI technology, BLUETOOTH, etc., or any combination thereof. For example, a CYBERLINK UPNP and/or INTEL UPNP TOOLKIT implementation can be used in third-party discovery module 416 to discovery service descriptions broadcast within the sub-network by UPnP. The remote site discovery 418 uses a web service protocol (a web service call) to a remote web service to discover SSDs identifiable by a web service interface.

According to an aspect of the embodiments described herein, JENA, by HEWLETT-PACKARD DEVELOPMENT COMPANY, is used to store SSDs 116. The parsing and indexing modules 410 comprise parsing and analysis functions to parse and analyze SSDs 116. For example, according to an aspect of the embodiments described herein, an SSD 116 is parsed using JENA, by HEWLETT-PACKARD DEVELOPMENT COMPANY, with support of PELLET and OWL-S API by MINDLAB, UNIVERSITY OF MARYLAND, USA. In particular, "a service 112 is discovered" is equivalent to "the SSD 116 semantically representing a service function 115 of a function source 114 (e.g., a device, software 114) is found." A SSD 116, which is discoverable by one of the service discovery modules 404, is sent to the central module 402, through the register interface 422, where the SSD 116 is first parsed, for example, by JENA with PELLET support. Once the SSD is parsed, PELLET is ready to answer RDQL queries. By asking queries from the service parsing and indexing module 410 and based upon the query results, the service composition and task execution planning module 412 completes a composition of services 112 as a task 126, and determines the execution plan for the task 126 in response to a task 126 execution command from a TCC 119. Once an execution plan is determined, the central module 402 invokes a related service function(s) 115, via the execution modules 406 that comprises a grounding invocation 424 provided in the SSD 116 to invoke a service function 115. The discovery modules 404 discover services 112 that can comprise service functions 115 and Semantic Service Descriptions (SSDs) 116. The above description of the service 112 parsing and indexing 410 are not limited to such a configuration and any mechanism to parse and analyze SSDs 116 can be used other than JENA and PELLET According to an aspect of the embodiments described herein, as an independent module, a WS TCC 119 can use any kinds of underlying service 112 discovery mechanisms 404 or execution mechanisms 406 as long as a unified and high-level abstracted discovery and execution mechanisms are implemented according to a Web services API(s) 106, for example, by implementing a Web Service interface 106 for underlying BLUETOOTH SDP, IR, RENDEZVOUS, JINI, etc. 404, 406. Therefore, for example, the only thing a user needs to specify is the Uniform Resource Locator (URL) of the Web Service Definition Language (WSDL) files for STEER-WS API 120 to interface with the service layer 112 (e.g., discovered services 115, 116). As along as the Web Service API 106 is provided, the whole underling discovery procedure by the TCE-WS API 106 is transparent to the user at the WS TCC 119 in presentation processing layer 104. For example, one of STEER-WS API 120a can be using BLUETOOTH discovery modules 404 to find and execute BLUETOOTH based services 112. Another STEER-WS API 120n can be using UPnP discovery modules 404.

According to an aspect of the embodiments, the following two service 112 discovery methods are discussed: (1) a native service discovery module 426; and (2) a temporary service discovery module 428. A discussed herein, discovery of a service 112 is effectively a discovery of the SSD 116 associated with the service function 115. The native service discovery module 426 is a one-time file-based discovery module. Several services 112 might be frequently used and often desired to be available constantly. For example, there are some services 112 that are grounded to an "always-on" web service 115 (such as AMAZON web service) or can be executed by WS TCS 118 (STEER-WS TCS 118a) without grounding. According to an aspect of the embodiments, "always-on" web service 115 refers to a web service 115 whose availability is not related to execution status of Task Computing System 118. In most cases, third-party venders might provide such an "always-on" web service 115. For these "always-on" web services 115, the associated service description 116 can be fixed, because information about the web service 115 (such as where the web service 115 is served) is fixed. Therefore, it can be possible to create "fixed" (means always constant) service descriptions 116 for such "always-on" services 115. In such a case, costly dynamic service discovery mechanisms, for example, by PIPE-WS TCS 118b (described in related pending U.S. patent application Ser. Nos. 10/733,328, and 11/115,403) is not necessary.

The native service discovery module 426 is a one-time light-weight discovery module for such services 112 that have a fixed service description and are frequently used. According to an aspect of the embodiments, the native service discovery module 426 runs only once at the initial startup stage of a WS TCS 118, such as the STEER-WS TCS 118a. For example, the STEER-WS TCS 118a loads or places all service description files 116 found as services 112 in a specified directory (for example, default "My Document\My Services") and registers these found services 112 in STEER-WS TCS 118a (e.g., available in the discovered service 112 window (or discovery pane) 142—FIG. 1B). After that, the native service discovery module 426 can be decommissioned. Table 1 gives a brief comparison between the native service discovery module 426 and the local service discovery module 414. A local service discovery 414 is based on "Socket communication." The local discovery module 414 open and listens to a predefined socket. When a local service is published by an application, the application will send a message to the predefined socket, thus, being discovered by the local discovery module 414. This mechanism is dynamic and deemed localized to the apparatus running a TCC 119, because the TCC apparatus is providing the service via the application running on the TCC apparatus. If the IP (Internet Protocol) address of the TCC apparatus changes, the service description has to be changed too.

TABLE 1

Native service discovery module 426 vs. local service discovery module 414

| | Native | Local |
|---|---|---|
| Technique used | File based | Socket based |
| Dynamic discovery feature | No | Yes |
| Additional software needed | No | Need PIPE 118b to publish services |
| Services are discovered | Once at the STEER-WS TCS 118a startup time | While PIPE 118b is running |
| Best suited for services | Used very often, with fixed descriptions | Associated with other applications, because a local service will not start by itself, but normally, based upon a user launching an application within OS. The application will provide services, and publish the associated SSD and the local discovery service module listening with an open socket discovers the published SSD. The application will publish the service when it starts, and un-publish the service when it stops |

The temporary service discovery module 428 is designed for services 112 that are only needed during the current execution session of a WS TCS 118, such as the STEER-WS TCS 118a, such as services 112 used in a task package (discussed below) which are required only while the user works with the tasklet of the task package. According to an aspect of the embodiments, the temporary service discovery module 428 provides two Web services APIs:

1. A register API which takes the service description as input and returns service ID if the registration is successful.

2. An unregister API which takes the service ID and has no return.

The temporary service discovery module 428 allows a user to publish/un-publish services 112 through Web services. However, the services 112 discovered through the Temporary Service Discovery Module 428 are transient only during the current execution session of a WS TCS 118, such as the STEER-WS TCS 118a. For example, these unnecessary services 112 will be no longer be discovered for the next time when STEER-WS TCS 118a restarts, because the information about temporary services 112 is cleared.

In FIG. 1A, PIPE-WS TCS 118b is another example of a WS TCS 118 to publish and manage semantic object instances. The PIPE-WS API 122 extracts Task Computing management functionalities 124 into independent modules and exposes them as standard Web Service interfaces 106 accessible by any WS TCC 119, such as "White Hole" 119b-1, "Service Manager" 119b-2, "Real-world object semanticizer" 119b-3, and "Database semanticizer" 119b-4. More particularly, PIPE-WS API 122 provides a Web services interface 106 for PIPE-WS TCSs 118b to manage services 112, such as publishing operating system or application objects, device services, etc. PIPE-WS TCS 118b is described in related pending U.S. patent application Ser. Nos. 10/733,328, and 11/115,403.

Presentation Processing Layer 104 User Interfaces:

The implementation of STEER-WS API 120 and PIPE-WS 122 makes it possible to provide a large variety of Task Computing 100 user interfaces 104 for WS TCCs 119, because a presentation processing layer 104 of a WS TCC 119 can be freed from the implementation of the modules of the Task Computing middleware processing layer 108. A user interface 104 example of WS TCC 119 is described herein for Tasklet-WS TCC 119a-5.

Tasklet WS TCC 119a-5:

A Tasklet TCC 119a-5 is a very light processing weight Task Computing Client (TCC) 119, which executes OWL-S files of a service(s) or a service composition(s) (task(s) 126). Among other ways of making Tasklet TCC to execute OWL-S files including from the command line, the preferred way is to invoke the Tasklet TCC by double-clicking (or some other appropriate OS operations) the OWL-S files to be executed. When the Tasklet TCC reads the OWL-S files, it will execute the services or the service compositions by using STEER-WS APIs 120. Tasklet TCC might show the control UIs of the service function 115 within its own window. In particular, with reference to FIG. 2, the Tasklet TCC 119a-5 invokes the "executeOWLS" API 120 to execute an OWL-S description. The Tasklet TCC 119a-5 uses the OWL-S "Process Model" and services grounding to store a task 126 to provide a "process model" tasklet. According to the embodiments, a service workflow tasklet (a tasklet plus a service workflow) and a task package are provided.

Figure 5A:
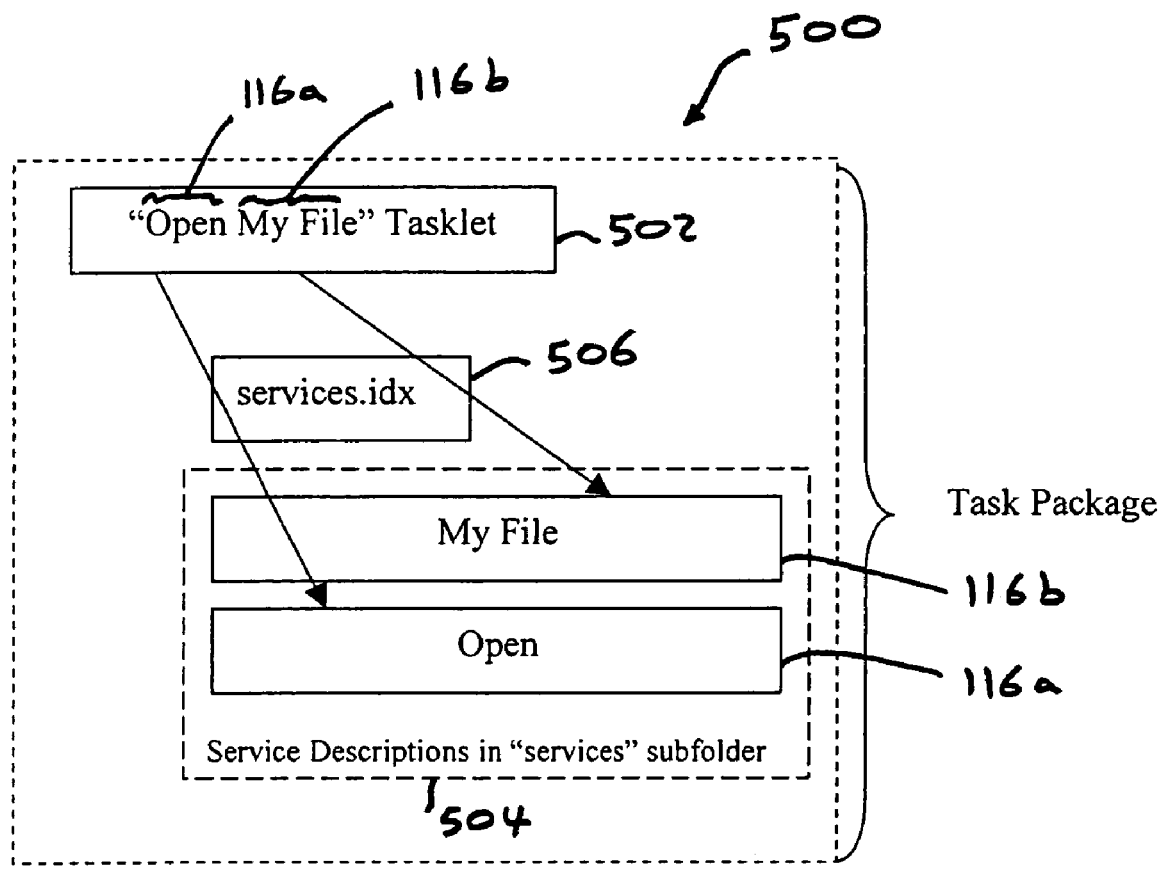
FIG. 5A is a diagram of a task package file structure, according to an embodiment of the present invention.

FIG. 5A is a diagram of a task package file structure, according to an embodiment of the present invention. According to an aspect of the embodiments, a "task package" 500, includes a service workflow tasklet (SW-Tasklet) 502 that contains service workflow information. SW-Tasklet 502 service workflow information and task package 500 improve the portability and the ability to edit the SSDs 116 (services 112) of the composed task 126 contained in the SW-Tasklet 502. The term "SW-Tasklet" refers to a semantically described task 126 (a computer interpretable semantic description of a composition of two or more services 112). For example, if a Tasklet TCC 119a-5 is based upon OWL-S and is an OWL-S file, while a user can use the "process model" tasklet to store, publish, execute and share a task 126, the services 116 (112) of the task composition 126 are not editable once created, because the task 126 is stored according to a "process model" defined in the OWL-S standard. The OWL-S "Process model" can be limited in many ways; for example, the "Process Model" is only for execution. Therefore, according to the embodiments the SW-Tasklet 502 has been extended to include a "service workflow." Here is a brief description of three ways to store a task 126 based upon OWL-S:

"Process Model" defined in OWL-S is for execution purpose. Only processes of individual services are involved, and it is not possible to extract the service workflow out of the process model.

"SW-Tasklet" is "Process Model" plus service workflow info. From SW-Tasklet, it is possible to retrieve the service workflow and list the task 126 as a composition of services 112.

However, if some services 112 are deemed missing (for example, not discovered in the current environment), both the execution and the editing can fail. Thus, a "Task Package" 500 is "SW-Tasklet" 502 plus description of all involved services 112 or all SSDs 116. With task package, even if some services 112 are missing, WS TCS 118 is still able to discover them (e.g., using temporary discovery mechanism) and continue the execution or the editing of the task 126 contained in the SW-Tasklet 502 of the task package 500.

In particular, each OWL-S file can includes three parts: (1) profile which defines the service name, service description (human readable explanation of the service), and/or semantic input/output, (2) process which defines the execution related information, and (3) grounding which maps the execution information to the real invocation methods. According to an aspect of the embodiments, each SSD 116 is an OWL-S file. Also, a SW-Tasklet 502 describing a task 126 of two or more SSDs 116 is an OWL-S file. The SW-Tasklet 502 as a composed task semantic description comprises generating, based upon the SSDs of the composed task, an execution plan as a SSDs process model of the composed task description, a services grounding of all the SSDs of the composed task, and as described in more detail, extracting and adding a service workflow of the composed task as a profile attribute in the composed task description. Thus, in an OWL-S file that describes a task 126 or in a SW-Tasklet 502, the process section or "process model" of the tasklet OWL-S file contains an execution plan, which only involves the processes section of the OWL-S files for the SSDs 116 in the composed task 126. Therefore, once a task 126 is built, from there, a TCC 119 cannot know which services 112 are involved and what their roles in the task 126 are, because service 112 may contain multiple processes, or multiple services 112 may share the same process. In both cases, from a "process model," it is not possible to identify which service 112 the processes belong. In other words, the "process model" might not reveal a one to one mapping of services 112 and processes, because the "profile" of the service 112 is not included in the "process model," so that it is not possible for a TCC 119 to open a "process model" tasklet that includes only a process model and restore to the stage where user initially builds the task 126 from services 112, such as the service workflow chart as a building block of services 112 shown in task window (or task 126 construction pane) 144.

Therefore, according to an aspect of the embodiments, the SW-Tasklet 502 comprises a service workflow information concept, so that a TCC 119 can open the SW-Tasklet 502 and restore to the stage where the user built the task 126 by composing a plurality of the services 112 via the SSDs 116. Within a tasklet service workflow, not only the related services 112, but the relationships between services 112 (how the output of one service 112 is mapped to the input of another service 112, etc.) are defined as well. From the tasklet service workflow, it is possible for a TCC 119 to load the tasklet/task package and display a task 126 as the composition of services 112 (initial building stage) in the task window (or task 126 construction pane) 144. The tasklet service workflow function provides the capability for users to load an existing task 126 and see how the task 126 is built from services 112. Within the same TCC 119, from the task 126, a user is able to add/remove/edit services 112, and create new tasks 126, via the task interface 130 provided by the TCC 119 (for example, FIG. 1B). This is called task 126 "editability."

For example, the service workflow information includes: (1) the number of services 116 (112) comprising a task 126, (2) IDs of these services 112 (i.e., ID of the SSD 116), and (3) how the services 112 are linked together to form the task 126. By referring to the tasklet service workflow information, a TCC (Task Computing Client) 119 can now recover the original design of the SW-Tasklet 502 task 126 as a service workflow comprising linked services 112.

FIGS. 6A-6D is a computer interpretable source code of a SW-Tasklet 502, according to an embodiment of the present invention. In particular, FIGS. 6A-6D is an OWL-S file for describing the task 126 "Open My File," which is a composition of two services 112 via SSDs 116 of "Open" 116*a* and "My File" 116*b*. In FIGS. 6A-6D, SW-Tasklet 502 is a valid OWL-S task 126 description and the SW-Tasklet 502 is executable. In FIG. 6B, for the SW-Tasklet 502 (Open My File.owls), the following lines are the service workflow information 512.

```
<j.0:workflowMetaInfo>[start workflow info]
http://www.general.com/services/local/
SelectFileService.owl#LocalFileURLProviderService
|http://www.general.com/services/local/
OpenService.owl#OpenURLService;
http://www.general.com/services/local/
SelectFileService.owl#URLOutput@0=http://www.
general.com/services/local/OpenService.owl#URLInput@1;
[end workflow info]</j.0:workflowMetaInfo>
```

In FIG. 6B, the service workflow 512 identifies two services "open" and "my file" via service IDs 516 and 518, respectively. Further, the service workflow 512 identifies "my file" output 520 and input of "Open" 522 matched with "My File" output 520, as services 112 (116) linkage 524.

In FIGS. 6B-6C, process flow lines 514, which are part of a standard in OWL-S, are required to execute a task 126, as follows:

```
<process:Process
rdf:about="http://www.general.com/services/local/SelectFileService.owl#LocalFileURL
Provider"/>
    <process:Process
rdf:about="http://www.general.com/services/local/OpenService.owl#OpenURL"/>
        <process:CompositeProcess
rdf:about="http://www.general.com/STEERXT/SaveService/46ef7209g10d0d1c5656gh
7ec3#ExecutionProcess">
            <process:composedOf>
                <process:Sequence
rdf:about="http://www.general.com/STEERXT/SaveService/46ef7209g10d0d1c5656gh
7ec3#Sequence">
                    <process:components>
                        <process:ControlConstructList>
```

-continued

```
    <list:rest>
        <process:ControlConstructList>
            <list:rest rdf:resource="http://www.daml.org/services/owl-s/1.1/generic/ObjectList.owl#nil"/>
            <list:first>
                <process:Perform
rdf:about="http://www.general.com/STEERXT/SaveService/46ef7209g10d0d1c5656gh7ec3#Performance1"/>
            </list:first>
        </process:ControlConstructList>
    <list:rest>
    <list:first>
        <process:Perform
rdf:about="http://www.general.com/STEERXT/SaveService/46ef7209g10d0d1c5656gh7ec3#Performance0"/>
    </list:first>
</process:ControlConstructList>
```

Using service workflow information, one can now easily share the details of a task 126. However, one possible short coming of the SW-Tasklet 502 is that a TCC 119 requires all of comprising services to be present to display the details correctly, because the SW-Tasklet 502 service workflow information gives only the service ID and relies on retrieving other important information, such as service names, service descriptions, semantic inputs/outputs, from individual SSDs 116 of the task 126. A SW-Tasklet 502 with service workflow information allows one to share the details of tasks 126 in a compact manner, however, the SW-Tasklet with service workflow information can limit the portability and the ability to edit the tasks 126, because some services 112 might be deemed missing (for example, not discovered in the current environment), both the execution and the editing could fail. Therefore, in addition to providing tasklet service workflow information, the embodiments provide a "task package." When the services 112 that are involved in a service workflow are discoverable within the environment, the service workflow alone is enough to restore the task 126.

In FIG. 5A, a "task package" 500 is a package file containing three types of files as follows: a SW-Tasklet 502, SSDs 116 of all related services 504, and an index file 506. The index file 506 stores mappings between service IDs (recorded in the tasklet's workflow information) and related service descriptions 504. According to an aspect of the embodiments, for example, the package file 500 can be according to the ZIP file format. FIG. 5B is a list of files in a zipped task package, according to an embodiment of the present invention.

In FIG. 5A, a task package 500 is a zipped file containing the following parts: a "services" subfolder which stores all the semantic descriptions 116 that comprise a task 126 (Open 116a and My File 116b in the example), a SW-Tasklet 502 which describes a task 126 in an OWL-S format along with its workflow information (Open My File SW-Tasklet 502), and an index file (services.idx) 506 which maps the services ID appearing in the SW-Tasklet 502 to the SSDs 116 of the task 126 stored in the "services" subfolder. FIGS. 7A-7C is an example computer interpretable source code representing a semantic service description for an "open" service, according to an embodiment of the present invention. FIGS. 8A-8C is an example computer interpretable source code representing a semantic service description for a "My File" service, according to an embodiment of the present invention. Therefore, the "Open" 116a and "My File" 116b shown in FIGS. 7 and 8 are in the "services" subfolder of the task package 500.

Therefore, within the services subfolder of the task package 500, the SSDs 116 of all service functions 115 involved in a composed task 126 of a plurality of service functions 115 are stored. The SW-Tasklet 502 also provides the service workflow information 512. The index file "services.idx" 506 defines a mapping between the service ID (used in the SW-Tasklet 502) and the SSDs files 116 (stored in services subfolder).

When the task package 500 is opened in a TCC 119, such as a STEER-WS TCC 119a, first the SW-Tasklet file 502 is extracted. Then, the TCC 119 checks whether all services 112 that the SW-Tasklet 502 needs are available (i.e. already discovered by the TCC 119). If the SW-Tasklet 502 services 116 are already discovered by the TCC 119, no action is taken. Otherwise, from the index file 506, the TCC 119 finds the descriptions of all missing services 116 and publish them through the temporary discovery module 428. The SW-Tasklet 502 services 116 can also be published through discovery mechanisms other than the temporary discovery module 428, but by not using the temporary discovery module 428, the discovered task package 500 services 116 could persist beyond the current task package task composition session. After all the missing services 116 are published and discovered by the TCC 119, the SW-Tasklet 502 loading procedure by the TCC 119 can be resumed. According to an aspect of the embodiments, the TCC 119 opens the task packet file 500, and for executing and/or editing the SW-Tasklet 502 (e.g., for displaying the composed task diagram to edit), the TCC 119 retrieves any missing or required SSDs 116 of the composed task 126 from the SSDs 116 in the task package 500. The TCC 119 publishes the retrieved SSDs 116 to make the SSDs 116 available for the TCC 119 by registering the SSDs 116 through the temporary service discovery 428. The TCC 119 calls the temporary service discovery 428 web service to submit the SSDs 116 retrieved from the task package 500 to the temporary service discovery 428 web service, and the temporary service discovery 528 accepts the input SSDs 116 over the web service interface from the TCC 119. The temporary service discovery 428 web service registers the accepted SSDs 116 for recognition by the TCC 119 as a discovered service 116 (112). According to an aspect of the embodiments, the temporary service discovery 428 parses accepted SSDs and creates a service 112 instance for the TCC 119. According to an aspect of the embodiments, the services published by the temporary service discovery 428 are only available, for example, to the TCC 119 launching the temporary service discover 428 as well as to others during an execution session of the TCC 119.

Therefore, a SW-Tasklet 502 is an executable OWL-S description which defines the execution plan of the task 126 based on the processes of involved services 112 as well as a service workflow of the involved services 112. A SW-Tasklet 502 with service workflow information has a special tag that represents the service workflow of the task 126 described in the SW-Tasklet 502. With the tasklet service workflow information, a TCC 119 can open the SW-Tasklet 502 and display, for example, in the user interface window 144, the involved services 112 and their relationships. However, in the TCC 119 environment, if one or more services 112 of the SW-Tasklet 502 are deemed missing, because such services 112 have not been discovered by or registered in the TCC 119, the open procedure may fail due to the missing information. Thus, a task package 500 contains the SW-Tasklet 502 and the description of all involved services 112 (or the SSDs 116). When a TCC 119 opens a task package 500, even if one or more services 112 of the SW-Tasklet 502 are missing, the user will be given an option to load the services 112 from the attached semantic service description 116. After all the missing services 112 are loaded, the complete task 126 will be restored. In sum, task package 500 is the most robust method of saving a task 126. Both tasklet with service workflow and task package support "task editability."

According to an aspect of the embodiments, both SW-Tasklet 502 and task package 500 are creatable in a TCC 119. For example, after a user creates a task 126 from a set of services 112, the use can have an option to save the task 126. While saving the task 126, that user can decide to save the task 126 as a SW-Tasklet 502 with service workflow or a task package (tasklet with service workflow information plus the description of individual services 112 that are involved in the task 126). Once the user makes the decision, the SW-Tasklet/task package can be generated.

Procedure of creating SW-Tasklet can be as follows:
1. Generate an OWL-S of the task as a "process model" only tasklet
2. Extract the service workflow information of the task and add the extracted service workflow information into the OWL-S as a profile attribute. According to an aspect of the embodiments, when a user creates tasks within a TCC 119 (for example, FIG. 1B for a STEER-WS TCC 119a), service workflow information is extracted from the editor of the STEER-WS TCC 119. According to an aspect of the embodiments, in FIG. 1B, the displayed composed task diagram is represented in a data structure, and an extraction procedure analyzes user's task composition, including editing, from the task data structure and calculates/determines the service workflow, for example, determines the number of services 116 (112) comprising a task 126, determines which services 116 (112) are involved in the task 126, for example, IDs of these services 112 (i.e., ID of the SSD 116), and determines how the services 116 (112) are linked together to form the task 126 (e.g., output of service 1 goes to input of service 2, and so on).
3. Store the OWL-S with the service workflow to a file as the SW-Tasklet 502.

Procedure of creating task package can be as follows:
1. Create SW-Tasklet as defined previously.
2. Add description of all involved services 116.
3. Create a mapping between service id and service description file name, and store the mapping in the services.idx file. FIG. 9 is an example of a task package index file 506, according to an embodiment of the present invention.
4. Zip the content.

The task package 500 is a significant improvement over a naïve way, in which user can manually zip a "process model" tasklet and related services to send to other users; and the recipient user needs to unzip the file, publish the missing services, and open the "process model" only tasklet finally. The benefits of task package are clear, because during the building of the task package in a TCC 119, the task package format allows TCC 119 to automatically detect all the related services 112 and zip those service descriptions 116 in the task package along with the SW-Tasklet and the corresponding index file. When the task package is run or opened in a TCC 119, the TCC 119 can automatically determine the task composed services, including any missing services 112. In the above naïve way, the recipient user needs to hand-pick the missing services 112 and to publish them manually.

Described herein is implementation of a Task Computing computer system by segmenting Task Computing 100 environment into a plurality of computer system implementation tiers of a presentation client processing layer, a remote procedure call application programming interface (API), a middleware server processing layer to which the presentation layer interfaces via the remote procedure call API to real-time, dynamically generate a computer implemented task interface at the presentation layer to a semantically described computer system source of function as a service on a computer system; a service layer and a function source realization layer providing the semantically described computer system source of function as the service on the computer system to which the middleware processing layer interfaces; and real-time, dynamically composing an executable task that comprises one or more services, according to the generated task interface at the presentation layer to one or more services on the computer system. A computer service is in real-time and dynamically composed into an executable task using the generated interface to the service on the computer based upon the semantically described application-, device- and service-rich computer. According to an aspect of the embodiments described herein a user practically, effectively, efficiently, dynamically, in real-time, relies on a flexible and unified user interface (composition and execution functions) to manage interaction and to interact with a pervasive computing environment.

An apparatus, method, and computer readable medium, including carrier signal thereof, provides a plurality of computing sources of functionality, each computing source of functionality presents a service, for example, to a user and/or a computer, and exists in a computing environment of the apparatus or in a computing environment in network communication with the apparatus. The apparatus associates a semantic service description (SSD) with the service. The SSD has a semantic description of the service, including a semantic description of a parameter of the service, according to a computer interpretable language, and, as a service grounding, a mapping between the computer interpretable language expressing the SSD and an interface, including an interface parameter, of the service. The apparatus dynamically discovers one or more SSDs as available services through a plurality of discovery mechanisms to discover the SSDs, dynamically filters the services based upon the semantic description in each SSD associated with each service, generates a user interface to dynamically compose a task based upon selecting the services and the filtering the services to continuously present possible tasks, and generates an executable semantic service workflow description as a composed task description of the composed task.

The generation of the executable semantic service workflow description comprises generating, based upon the SSDs of the composed task, an execution plan as a SSDs process model of the composed task description, a list of service groundings of all the SSDs of the composed task, and extracting and adding a service workflow of the composed task as a profile attribute in the composed task description.

Task Computing, is the approach that: (a) seeks to exploit SemanticWeb technologies, so that the larger (semantic) web of resources will be immediately available to ubiquitous computing applications, and (b) is quite agnostic about the nature of the resources, as regardless of how they are discovered, accessed, connected to, or communicated with, a service abstraction 116 can be used to make them usable by a Task Computing 100 system. Task Computing relies on semantically described services 116 as the universal abstraction of all functionality; and in addition, Task Computing has a larger scope than device-to-service interoperability, as composable tasks 126 may involve many services 112. For example, a typical Task Computing 100 system task 126 might real-time, dynamically utilize 5-6 services 112.

The above described preferred embodiments of the present invention are implemented in software (as stored on any known computer readable media) and/or programmable computing apparatus/hardware controlling a programmable apparatus/computing device (for example, a programmable electronic device that can store, retrieve, present (for example, display) and process data)—any type of programmable computing apparatus, such as (without limitation) a personal computer, a server and/or a client computer in case of a client-server network architecture, networked computers in a distributed network architecture, a terminal device, a personal digital assistant, a mobile device).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus configured to provide a plurality of computing sources of functionality, each computing source of functionality presenting a service and existing in a computing environment of the and/or in a computing environment in network communication with the apparatus, the apparatus comprising:
   a controller to control the apparatus according to a process, comprising:
   associating a semantic service description (SSD) with the service, wherein the SSD comprises a semantic description of the service, including a semantic description of a parameter of the service, according to a computer interpretable language, and, as a service grounding, a mapping between the computer interpretable language expressing the SSD and an interface, including an interface parameter, of the service;
   dynamically discovering one or more SSDs as available services through a plurality of discovery mechanisms to discover the SSDs;
   dynamically filtering the services based upon the semantic description in each SSD associated with each service;
   generating a user interface to dynamically compose a task based upon selecting the services and the dynamically filtering the services to continuously present possible tasks; and
   generating a task package file that includes:
   an execution plan for the composed task in form of an executable semantic service workflow description that specifies the services, including a condition about a service, and defines relationships among the services in the composed task,
   a process model of the composed task, and
   one or more of the SSDs associated with the services in the composed task.

2. The apparatus according to claim 1 wherein the service workflow further comprises a number of SSDs in the task, identification of the SSDs in the task, or link information to describe linkage of the SSDs in the task, or any combinations thereof.

3. The apparatus according to claim 1 wherein the task package file is cross computing environment executable.

4. The apparatus according to claim 1, wherein the task package file is according to a zip format.

5. The apparatus according to claim 1, wherein the process of the controller further comprises restoring the composed task in the user interface for edition or execution, or any combinations thereof, according to the task package file.

6. The apparatus according to claim 5, wherein the composed task restoring comprises:
   presenting through the user interface the services included in the composed task, based upon the executable semantic service workflow description of the composed task, including any discovering the services of the composed task, based upon the plurality of discovery mechanisms to discover the SSDs associated with the services in the composed task via a temporary service discovery for current task composition including edition and/or execution by accepting the associated SSDs in the task package file over a web service interface and registering the accepted associated SSDs as available discovered services, or a native service discovery as a one-time discovery of services having a fixed service description, or an apparatus localized service discovery according to a socket published service message from an application, or a third party discovery mechanism, or any combinations thereof.

7. The apparatus according to claim 1, wherein the plurality of service discovery mechanisms comprises a native service discovery as a one-time discovery of services having a fixed service description.

8. The apparatus according to claim 1, wherein the plurality of service discovery mechanisms comprises a temporary service discovery as a discovery of the service by accepting the SSD associated with the service over a web service interface and registering the SSD as an available discovered service.

9. The apparatus according to claim 1, wherein the process of the controller further comprises executing the task by utilizing the services grounding to translate for each service between the service interface parameter and the semantically described parameter of the service and by managing a sequence of executing the services through the process model of the composed task.

10. The apparatus according to claim 1, wherein the process of the controller further comprises dynamically filtering the discovered SSDs as discovered services based upon relevance of the discovered services to the user and the user context by examining the semantic description of the service in an SSD and/or based upon the discovery mechanism that discovered the SSD.

11. The apparatus according to claim 10, wherein the filtering is according to a Resource Description Framework Data Query Language (RDQL) query.

12. The apparatus according to claim 1, wherein the computer interpretable language expressing the SSD is Web Ontology Language (OWL) based Web service ontology (OWL-S) language.

13. The apparatus according to claim 1,
wherein each SSD defines according to an ontology a functional characteristic of each service, and
wherein the services are filtered according to compatibility based upon the SSD defined functional characteristic of each service.

14. The apparatus according to claim 13,
wherein the associating the SSD with the service comprises assigning a name to the service as an element of a natural language sentence to support composability of the services mapping into composability of natural language elements as a natural language sentence, and
wherein the generating the user interface comprises supporting composing the task of the selected filtered services based upon the natural language service names according to a natural language sentence.

15. The apparatus according to claim 14, wherein the user interface is a computer displayed screen graphical user interface, and the graphical user interface comprises:
displaying in a first graphical user interface window selectable graphical displays of the discovered SSDs as the available services according to a tree structure;
presenting a second graphical user interface window supporting real-time, dynamic composition of the one or more services into the task according to a process, comprising:
selecting by a user a discovered service in the first window;
automatically displaying a selectable graphical display of other compatible services in connection with the selected discovered service;
selecting by a user a compatible service; and
real-time, dynamically displaying in the second graphical user interface window a directed service graph according to the user selecting of the discovered service and the compatible services as the task; and
displaying a selectable graphical display of task execution to execute the task.

16. The apparatus according to claim 15, wherein the displayed discovered services are organized in the first graphical user interface window according to the functional characteristics of the discovered services.

17. A method of providing task computing based upon a plurality of computing sources of functionality, each computing source of functionality presenting a service and existing in a computing environment of an apparatus and/or a computing environment in network communication with an apparatus, the method comprising:
supporting association of a semantic service description (SSD) with the service, wherein the SSD comprises a semantic description of the service, including a semantic description of a parameter of the service, according to a computer interpretable language, and, as a service grounding, a mapping between the computer interpretable language expressing the SSD and an interface, including an interface parameter, of the service; and
causing a computer to execute:
dynamically discovering one or more SSDs as available services through a plurality of discovery mechanisms to discover the SSDs;
dynamically filtering the services based upon the semantic description in each SSD associated with each service;
generating a user interface to dynamically compose a task based upon selecting the services and the dynamically filtering the services to continuously present possible tasks;
generating a task package file that includes:
an execution plan for the composed task in form of an executable semantic service workflow description that specifies the services, including a condition about a service, and defines relationships among the services in the composed task,
a process model of the composed task, and
one or more of the SSDs associated with the services in the composed task.

18. An apparatus configured to provide a plurality of computing sources of functionality, each computing source of functionality presenting a service and existing in a computing environment of the apparatus and/or a computing environment in network communication with the apparatus, the apparatus comprising:
means for associating a semantic service description (SSD) with the service, wherein the SSD comprises a semantic description of the service, including a semantic description of a parameter of the service, according to a computer interpretable language, and, as a service grounding, a mapping between the computer interpretable language expressing the SSD and an interface, including an interface parameter, of the service;
means for dynamically discovering one or more SSDs as available services through a plurality of discovery mechanisms to discover the SSDs;
means for dynamically filtering the services based upon the semantic description in each SSD associated with each service;
means for generating a user interface to dynamically compose a task based upon selecting the services and the dynamically filtering the services to continuously present possible tasks;
means for generating a task package file that includes:
an execution plan for the composed task in form of an executable semantic service workflow description that specifies the services, including a condition about a service, and defines relationships among the services in the composed task,
a process model of the composed task, and
one or more of the SSDs associated with the services in the composed task, and an index.

* * * * *

UNITED STATES PATENT AND TRADEMARK OFFICE
CERTIFICATE OF CORRECTION

PATENT NO. : 8,117,280 B2  
APPLICATION NO. : 11/512405  
DATED : February 14, 2012  
INVENTOR(S) : Ryusuke Masuouka et al.

Page 1 of 1

It is certified that error appears in the above-identified patent and that said Letters Patent is hereby corrected as shown below:

Column 1, Line 9 (Approx.), Delete "Masuoka," and insert -- Masuouka, --, therefor.

Column 1, Line 15, Delete "Masuoka," and insert -- Masuouka, --, therefor.

Column 1, Line 21, Delete "Masuoka," and insert -- Masuouka, --, therefor.

Column 27, Line 41, In Claim 1, delete "of the" and insert -- of an apparatus --, therefor.

Signed and Sealed this  
Twenty-ninth Day of May, 2012

David J. Kappos  
*Director of the United States Patent and Trademark Office*